United States Patent
Terasaka et al.

(10) Patent No.: US 8,235,471 B2
(45) Date of Patent: Aug. 7, 2012

(54) APPARATUS FOR CONTROLLING PUMP DRIVING MOTOR

(75) Inventors: Masato Terasaka, Kariya (JP);
Masayoshi Oishi, Anjo (JP); Koji Tsuji, Obu (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 1411 days.

(21) Appl. No.: 11/819,223

(22) Filed: Jun. 26, 2007

(65) Prior Publication Data

US 2008/0001472 A1    Jan. 3, 2008

(30) Foreign Application Priority Data

Jun. 28, 2006 (JP) ................. 2006-177732
Nov. 17, 2006 (JP) ................. 2006-311003

(51) Int. Cl.
   *B60T 13/18* (2006.01)
(52) U.S. Cl. ........................... 303/11; 303/191
(58) Field of Classification Search ............... 303/10, 303/11, 191
   See application file for complete search history.

(56) References Cited

U.S. PATENT DOCUMENTS

| | | | | |
|---|---|---|---|---|
| 5,683,149 A | * | 11/1997 | Aizawa et al. | 303/10 |
| 5,992,952 A | * | 11/1999 | Kubota | 303/191 |
| 6,244,672 B1 | * | 6/2001 | Hachtel | 303/122.09 |
| 6,339,738 B1 | | 1/2002 | Kohl et al. | |
| 6,719,377 B1 | | 4/2004 | Zimmermann et al. | |
| 6,913,326 B1 | * | 7/2005 | Ohkubo et al. | 303/11 |
| 7,175,241 B2 | * | 2/2007 | Kokubo | 303/122.12 |

FOREIGN PATENT DOCUMENTS

| | | |
|---|---|---|
| JP | 09-267736 A | 10/1997 |
| JP | 2001-505505 A | 4/2001 |
| JP | 2002-506406 A | 2/2002 |
| JP | 2005-059627 A | 3/2005 |

* cited by examiner

*Primary Examiner* — Bradley King
(74) *Attorney, Agent, or Firm* — Buchanan Ingersoll & Rooney PC

(57) ABSTRACT

An apparatus for controlling a pump driving motor includes estimated fluid volume obtaining means for obtaining an estimated volume of a brake fluid discharged to a reservoir, hydraulic pump controlling means for specifying the number of rotations of the motor for driving a hydraulic pump based on the estimated volume and for driving the hydraulic pump with the specified number of rotations, and changing means for changing the number of rotations of the motor to be smaller than the number of rotations specified on the basis of the estimated volume in a case where an actual time defined from a driving start of the hydraulic pump to a point where the brake fluid in the reservoir actually turns to zero is shorter than an estimated time over which the estimated volume turns to zero by a driving of the hydraulic pump with the specified number of rotations of the motor.

10 Claims, 21 Drawing Sheets

APPARATUS FOR CONTROLLING PUMP DRIVING MOTOR

CROSS REFERENCE TO RELATED APPLICATIONS

This application is based on and claims priority under 35 U.S.C. §119 to Japanese Patent Application No. 2006-177732, filed on Jun. 28, 2006, and No. 2006-311003, filed on Nov. 17, 2006, the entire content of which is incorporated herein by reference.

FIELD OF THE INVENTION

This invention generally relates to an apparatus for controlling a pump driving motor. More particularly, this invention pertains to an apparatus for controlling a pump driving motor, the apparatus controlling a rotational speed of the motor that drives a hydraulic pump used to suck a brake fluid from a reservoir and to return the brake fluid to a hydraulic circuit of an anti-skid control apparatus during a pressure-reducing control in the anti-skid control.

BACKGROUND

A known apparatus for controlling a pump driving motor is disclosed in JP2002-506406A (corresponding to U.S. Pat. No. 6,719,377). According to the apparatus disclosed, a drive pattern of the motor (i.e., motor drive pattern) constituted by a voltage threshold value and a duration time is determined. The voltage threshold value is compared with a voltage that the motor generates when a power supply to the motor is in an OFF state, i.e., a voltage that the motor serving as a generator generates from an induced electromotive force (which will be hereinafter simply referred to as a "generation voltage"). The duration time is a time period during which the power supply to the motor is retained in an ON state.

The power supply to the motor is ON/OFF controlled by the motor drive pattern so that the power supply is switched from the OFF state to the ON state when the generation voltage generated by the motor falls to or below the voltage threshold value while the power supply to the motor is in the OFF state, and the power supply is switched from the ON state to the OFF state after the power supply is retained in the ON state for the duration time. Accordingly, an average rotational speed of the motor (and therefore an average fluid volume discharged from a hydraulic pump) can be controlled to be greater when the voltage threshold value is larger and the duration time is longer during the anti-skid control. The fluid volume discharged from the hydraulic pump, in this case, is the volume of fluid discharged from the hydraulic pump per time unit.

In the cases where the rotational speed of the motor is low during the anti-skid control, the fluid volume discharged from the hydraulic pump (i.e., fluid discharge volume of the hydraulic pump) becomes small, which may cause a reservoir to be filled with a brake fluid. In this case, an issue such as a stroke of a brake pedal that increases, and a wheel cylinder pressure that is prevented from sufficiently decreasing during a pressure-reducing control of the anti-skid control, may be raised. On the other hand, when the rotational speed of the motor is high, an issue such as an operating noise of the motor and the hydraulic pump that increase, may be raised. That is, during the anti-skid control, it is considered that the rotational speed of the motor is desirably specified to be low when the volume of brake fluid in the reservoir (i.e., reservoir fluid volume) is small while the rotational speed is specified to be high when the reservoir fluid volume is large.

In addition, since a master cylinder pressure (and therefore a discharge pressure of the hydraulic pump) acts as a load of the hydraulic pump, the rotational speed of the motor becomes low when the master cylinder pressure is large in the cases where the motor drive pattern is fixed.

Accordingly, as disclosed in JPH09-267736A, JP2001-505505A (corresponding to U.S. Pat. No. 6,339,738), and JP2005-59627A, it is known that the reservoir fluid volume and the master cylinder pressure are estimated, and then the motor drive pattern is selected in such a way that in which an average power supply to the motor is larger (i.e., precisely, the voltage threshold value is larger or the duration time is longer) when the estimated reservoir fluid volume (i.e., reservoir fluid estimated value) is larger or the estimated master cylinder pressure (i.e., master cylinder pressure estimated value) is larger.

As a result, regardless of the reservoir fluid volume or the master cylinder pressure, the rotational speed of the motor (and thus the fluid discharge volume of the hydraulic pump) can be specified to be an appropriate value. The motor drive pattern determined on the basis of the reservoir fluid estimated value and the master cylinder pressure estimated value will be hereinafter referred to as a "motor base drive pattern".

Even if the motor drive pattern is fixed, the rotational speed of the motor may become small (and thus the fluid discharge volume of the hydraulic pump may become small) along with a progress of a deterioration of the motor. In addition, even if the rotational speed of the motor is fixed, the fluid discharge volume of the hydraulic pump may become small along with a progress of a deterioration of the hydraulic pump. Further, in the cases where the reservoir fluid estimated value or the master cylinder pressure estimated value is calculated to be smaller than an actual value, the motor base drive pattern in which the average power supply to the motor is smaller may be selected, which may cause a lower rotational speed of the motor (and thus a smaller fluid discharge volume of the hydraulic pump).

That is, in the cases where the motor or the hydraulic pump becomes deteriorated, or the reservoir fluid estimated value or the master cylinder pressure estimated value is calculated to be smaller than the actual value, an insufficiency of the fluid discharge volume of the hydraulic pump may occur when the motor is driven by the motor base drive pattern. As a result, an issue such as a stroke of a brake pedal that increases, and the wheel cylinder pressure that is prevented from sufficiently decreasing in the pressure-reducing control of the anti-skid control, may be raised.

On the other hand, in the cases where the reservoir fluid estimated value is calculated to be larger than the actual value, the motor base drive pattern in which the average power supply to the motor is larger is selected. Thus, the rotational speed of the motor becomes high when the motor is driven by the motor base drive pattern. An issue such as an operating noise of the motor and the hydraulic pump that increase, may be raised Thus, a need exists for an apparatus for controlling a pump driving motor that can securely select an appropriate motor drive pattern and retain a rotational speed of the motor at an appropriate level.

SUMMARY OF THE INVENTION

According to an aspect of the present invention, an apparatus for controlling a pump driving motor, the apparatus being used in an anti-skid control apparatus performing a combination of a pressure-reducing control and a pressure-intensifying control multiple times, the pressure-reducing control in which a wheel cylinder pressure of a wheel decreases when the wheel is brought to a locked state during a braking of a vehicle, the pressure-intensifying control in which the wheel cylinder pressure increases when the locked state of the wheel is released by the pressure-reducing control, the apparatus for controlling a pump driving motor includes estimated fluid volume obtaining means for obtaining a reservoir fluid estimated value that is an estimated volume of a brake fluid discharged to a reservoir during the pressure-reducing control performed at a predetermined time, hydraulic pump controlling means for specifying the number of rotations of the motor for driving a hydraulic pump that sucks the brake fluid from the reservoir based on the estimated volume and for driving the hydraulic pump with the specified number of rotations of the motor, and changing means for changing the number of rotations of the motor applied when the brake fluid in the reservoir is discharged to be smaller than the number of rotations of the motor specified on the basis of the estimated volume at a time of the pressure-reducing control that follows the pressure-intensifying control performed at the predetermined time in a case where an actual time defined from a driving start of the hydraulic pump to a point where the brake fluid in the reservoir actually turns to zero is shorter than an estimated time over which the estimated volume turns to zero by a driving of the hydraulic pump with the specified number of rotations of the motor.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
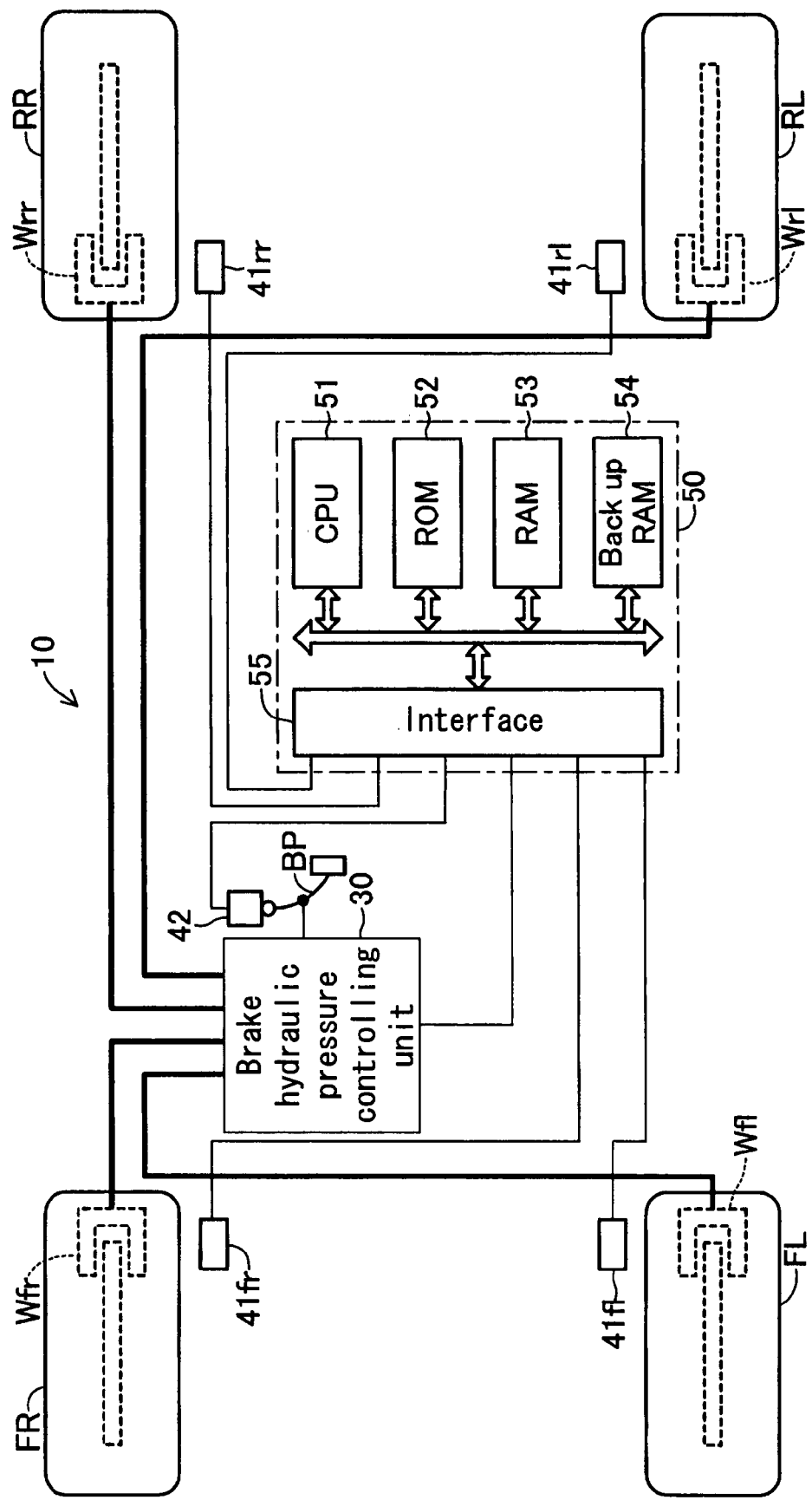
FIG. 1 is a schematic view illustrating a structure of a vehicle in which a brake apparatus including an apparatus for controlling a pump driving motor according to embodiments of the present invention is mounted.

Embodiments of the present invention will be explained with reference to the attached drawings. FIG. 1 is a view schematically illustrating a structure of a vehicle in which a brake apparatus 10 including an apparatus for controlling a pump driving motor according to the present embodiment is mounted.

Figure 2:
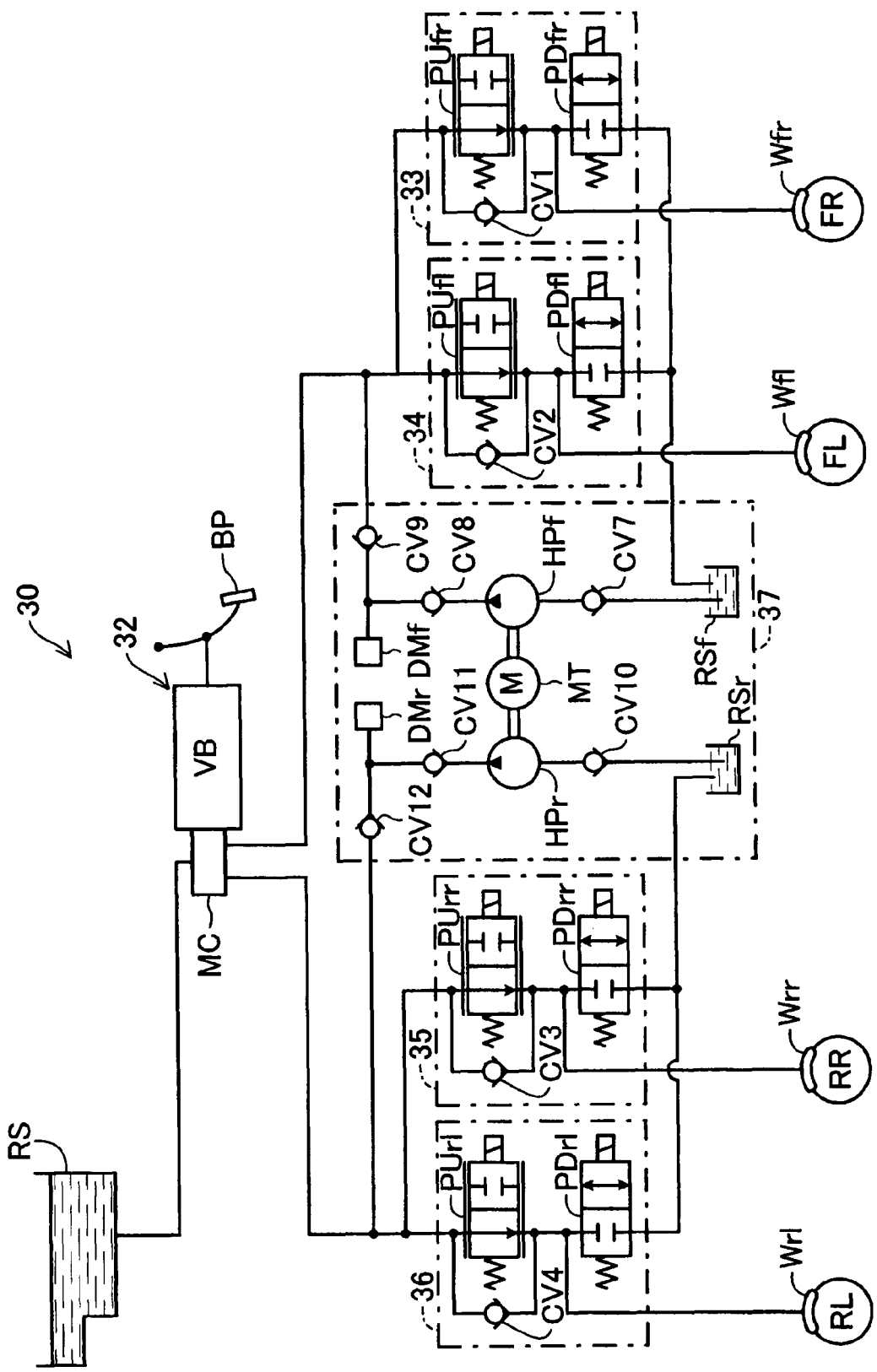
FIG. 2 is a schematic view illustrating a structure of a brake hydraulic pressure controlling unit provided at the brake apparatus.

The brake apparatus 10 includes a brake hydraulic pressure controlling unit 30 (anti-skid control apparatus) for causing a brake force that is acquired by a brake hydraulic pressure to be generated at each wheel. As illustrated in FIG. 2, the brake hydraulic pressure controlling unit 30 includes a brake hydraulic pressure generating unit 32 for generating the brake hydraulic pressure in response to an operating force of a brake pedal BP. In addition, the brake hydraulic pressure controlling unit 30 includes a FR brake hydraulic pressure adjusting portion 33, a FL brake hydraulic pressure adjusting portion 34, a RR brake hydraulic pressure adjusting portion 35, and a RL brake hydraulic pressure adjusting portion 36 capable of adjusting a brake fluid pressure applied to wheel cylinders Wfr, Wfl, Wrr, and Wrl arranged at wheels FR, FL, RR, and RL, respectively, and a reflux brake fluid supplying portion 37.

The brake hydraulic pressure generating unit 32 includes a vacuum booster VB activated in response to an operation of the brake pedal BP, and a master cylinder MC connected to the vacuum booster VB. The vacuum booster VB assists and boosts the operating force of the brake pedal BP at a predetermined ratio by utilizing an air pressure (negative pressure) in an intake pipe of an engine (not shown) so as to transmit the assisted and boosted operating force to the master cylinder MC.

The master cylinder MC includes a two-system output port constituted by a first port and a second port. Upon receiving a brake fluid from a reservoir RS, a first master cylinder pressure is generated at the first port in response to the assisted operating force of the brake pedal BP while a second master cylinder pressure is generated at the second port in response to the assisted operating force that is substantially the same hydraulic pressure level as that of the first master cylinder pressure. The master cylinder MC and the vacuum booster VB each have a known structure and operation and thus detailed explanation thereof will be omitted. The master cylinder MC and the vacuum booster VB (brake hydraulic pressure generating means) generate the first master cylinder pressure and the second master cylinder pressure in response to the operating force of the brake pedal BP accordingly.

The first port of the master cylinder MC is connected to an upstream side of the FR brake hydraulic pressure adjusting portion 33 and an upstream side of the FL brake hydraulic pressure adjusting portion 34. In the same way, the second port of the master cylinder MC is connected to an upstream side of the RR brake hydraulic pressure adjusting portion 35 and an upstream side of the RL brake hydraulic pressure adjusting portion 36. Accordingly, the first master cylinder pressure is supplied to respective upstream portions of the FR brake hydraulic pressure adjusting portion 33 and the FL brake hydraulic pressure adjusting portion 34 while the second master cylinder pressure is supplied to respective upstream portions of the RR brake hydraulic pressure adjusting portion 35 and the RL brake hydraulic pressure adjusting portion 36.

The FR brake hydraulic pressure adjusting portion 33 includes a pressure-intensifying valve PUfr that is a normally open linear solenoid valve and a pressure-reducing valve PDfr that is a two-port two-position switchover normally-closed solenoid on-off valve. The pressure-reducing valve PDfr interrupts a communication between the wheel cylinder Wfr and a reservoir RSf when the pressure-reducing valve PDfr is in a closed state (corresponding to a non-excitation, i.e., OFF, state) as illustrated in FIG. 2. On the other hand, the pressure-reducing valve PDfr establishes a communication between the wheel cylinder Wfr and the reservoir RSf when the pressure-reducing valve PDfr is in an open state (corresponding to an excitation, i.e., ON, state).

A valve body of the pressure-intensifying valve PUfr constantly receives a force for opening the valve based on a biasing force of a coil spring (not shown). In addition, the valve body receives a force for opening the valve based on a differential pressure between the master cylinder pressure and the wheel cylinder pressure (which will be hereinafter simply referred to as an "actual differential pressure"), and a force for closing the valve based on a suction force that proportionally increases in response to a flowing current value (i.e., command current value Id) of the pressure-intensifying valve PUfr.

Figure 3:
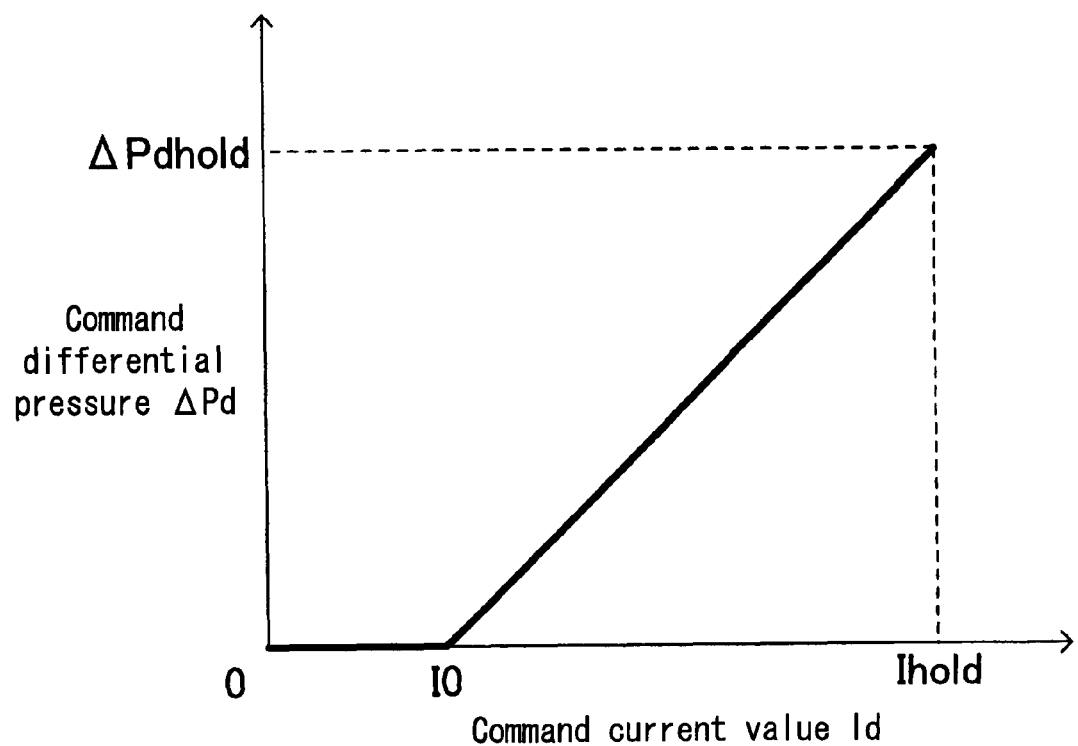
FIG. 3 is a graph illustrating a relationship between a command current and a command differential pressure of a pressure-intensifying valve provided at the brake hydraulic pressure controlling unit.

As a result, as illustrated in FIG. 3, a command differential pressure ΔPd corresponding to the aforementioned suction force is determined so as to proportionally increase in response to the command current value Id. I0 in FIG. 3 is a current value corresponding to the biasing force of the coil spring. The pressure-intensifying valve PUfr is closed when the command differential pressure ΔPd is larger than the actual differential pressure (i.e., the command current value Id is larger than a current value corresponding to the actual differential pressure) so as to interrupt the communication between the upstream portion of the brake hydraulic pressure adjusting portion 33 and the wheel cylinder Wfr. On the other hand, the pressure-intensifying valve PUfr is opened when the command differential pressure ΔPd is smaller than the actual differential pressure (i.e., the command current value Id is smaller than a current value corresponding to the actual differential pressure) so as to establish the communication between the upstream portion of the brake hydraulic pressure adjusting portion 33 and the wheel cylinder Wfr. As a result, the brake fluid provided at the upstream portion of the FR brake hydraulic pressure adjusting portion 33 inflows into the wheel cylinder Wfr to thereby adjust the actual differential pressure to be equal to the command differential pressure ΔPd.

That is, a maximum allowable value of the actual differential pressure can be controlled depending on the command current value Id of the pressure-intensifying valve PUfr. In addition, when the pressure-intensifying valve PUfr is brought to the non-excitation state (i.e., the command current value Id is defined to be zero), the pressure-intensifying valve PUfr can be retained in the open state, because of the biasing force of the coil spring. Further, when the command current value Id is defined to be a value corresponding to the command differential pressure ΔPd that is sufficiently greater than the possible actual differential pressure such as a closed valve retention current value Ihold as illustrated in FIG. 3, for example, the pressure-intensifying valve PUfr can be retained in the closed state.

Accordingly, in the cases where the command current value Id to the pressure-intensifying valve PUfr is brought to gradually decrease from a current value corresponding to the actual differential pressure at that point while the pressure-reducing valve PDfr is in the closed state, the actual differential pressure gradually decreases. As a result, the brake fluid pressure in the wheel cylinder Wfr (i.e., wheel cylinder pressure) increases smoothly. This operation is called a linear pressure-intensifying mode operation.

In addition, in the cases where the pressure-reducing valve PDfr is in the closed state while the pressure-intensifying valve PUfr is retained in the closed state, the wheel cylinder pressure is retained at the hydraulic pressure level at that time regardless of the hydraulic pressure at the upstream portion of the FR brake hydraulic pressure adjusting portion 33. This operation is called a hold mode operation. Further, in the cases where the pressure-reducing valve PDfr is in the open state while the pressure-intensifying valve PUfr is retained in the closed state, the brake fluid in the wheel cylinder Wfr is refluxed to the reservoir RSf to thereby reduce the wheel cylinder pressure. This operation is called a pressure-reducing mode operation.

Accordingly, a linear pressure-intensifying control, a hold control, and a pressure-reducing control are performed on the brake hydraulic pressure in the wheel cylinder Wfr (i.e., wheel cylinder pressure Pwfr) in response to three control modes of the linear pressure-intensifying mode, the hold mode, and the pressure-reducing mode.

As illustrated in FIG. 2, a check valve CV1 is arranged in parallel with the pressure-intensifying valve PUfr for the purpose of allowing the brake fluid to flow only in one direction, i.e., from a side of the wheel cylinder Wfr to the upstream portion of the FR brake hydraulic pressure adjusting portion 33. As a result, when the brake pedal BP that has been depressed by a driver is released, the brake hydraulic pressure is immediately reduced.

In the same way, the FL brake hydraulic pressure adjusting portion 34, the RR brake hydraulic pressure adjusting portion 35, and the RL brake hydraulic pressure adjusting portion 36 include a pressure-intensifying valve PUfl and a pressure-reducing valve PDfl, a pressure-intensifying valve PUrr and a pressure-reducing valve PDrr, and a pressure-intensifying valve PUrl and a pressure-reducing valve PDrl, respectively. Then, when each of these pressure-intensifying valves (normally-open linear solenoid valves) and pressure-reducing valves (normally-closed solenoid on-off valves) is controlled, the linear pressure-intensifying control, the hold control, or the pressure-reducing control can be performed on the brake hydraulic pressure in each of the wheel cylinders Wfl, Wrr, and Wrl (i.e., wheel cylinder pressure Pwfl, Pwrr, and Pwrl). Check valves CV2, CV3, and CV4 each having the same function as that of the check valve CV1 are arranged in parallel with the pressure-intensifying valves PUfl, PUrr, and PUrl, respectively.

The reflux brake fluid supplying portion 37 includes a direct current motor MT and two hydraulic pumps HPf and HPr driven by the motor MT simultaneously. The hydraulic pump HPf suctions the brake fluid via a check valve CV7 from the reservoir RSf, which returns thereto from the pressure-reducing valves PDfr and PDfl, and supplies that brake fluid via check valves CV8 and CV9 back to the respective upstream portions of the FR brake hydraulic pressure adjusting portion 33 and the FL brake hydraulic pressure adjusting portion 34.

Likewise, the hydraulic pump HPr suctions the brake fluid via a check valve CV10 from a reservoir RSr, which returns thereto from the pressure-reducing valves PDrr and PDrl, and supplies that brake fluid via check valves CV11 and CV12 back to the respective upstream portions of the RR brake hydraulic pressure adjusting portion 35 and the RL brake hydraulic pressure adjusting portion 36. In order to reduce pulsation of discharge pressure of the hydraulic pumps HPf and HPr, dumpers DMf and DMr are arranged in respective hydraulic circuits between the check valves CV8 and CV9, and the check valves CV11 and CV12.

According to the aforementioned structure, the brake hydraulic pressure controlling unit 30 can supply the brake hydraulic pressure to each of the wheel cylinders in response to the operation force of the brake pedal BP (i.e., master cylinder pressure) in the cases where all of the solenoid valves, i.e., the pressure-intensifying valves and the pressure-reducing valves, are in the non-excitation state. In such state, when the pressure-intensifying valve PUrr and/or the pressure-reducing valve PDrr are controlled, for example, the wheel cylinder pressure Pwrr only can be adjusted to be lower than the master cylinder pressure. That is, the brake hydraulic pressure controlling unit 30 can individually reduce each wheel cylinder pressure at each of the wheel cylinders relative to the master cylinder pressure.

As illustrated in FIG. 1, the brake apparatus 10 includes wheel speed sensors 41fl, 41fr, 41rl, and 41rr each for outputting a pulse signal each time a corresponding wheel rotates by a predetermined angle. The brake apparatus 10 also includes an electronic control unit 50, and a brake switch 42 for outputting an ON signal (i.e., High signal) or an OFF signal (i.e., Low signal) depending on whether or not the brake pedal BP is depressed by a driver.

The electronic control unit 50 is a microcomputer that includes a CPU 51 (changing means), a ROM 52, a RAM 53, a back up RAM 54, and an interface 55 all of which are interconnected with one another via a bus. The ROM 52 stores a routine (program), a table (lookup table and map), a constant, and the like beforehand. The. RAM 53 temporarily stores data as necessary. The back up RAM 54 stores data while the power is supplied and holds that data when the power supply is interrupted. The interface 55 includes an AD converter.

The interface 55 is connected to the wheel speed sensor 41 and the brake switch 42 so as to supply a signal therefrom to the CPU 51. The interface 55 also sends a drive signal to the solenoid valve (i.e., the pressure-intensifying valve PU and the pressure-reducing valve PD* *) based on a command from the CPU 51.

The symbol  affixed to the end of each variable indicates a comprehensive notation, such as "fl" and "fr", that is affixed to indicate which wheels the variable is for. For example, the pressure-intensifying valve PU comprehensively indicates the front left pressure-intensifying valve PUfl, the front right pressure-intensifying valve PUfr, the rear left pressure-intensifying valve PUrl and the rear right pressure-intensifying valve PUrr.

Figure 4:
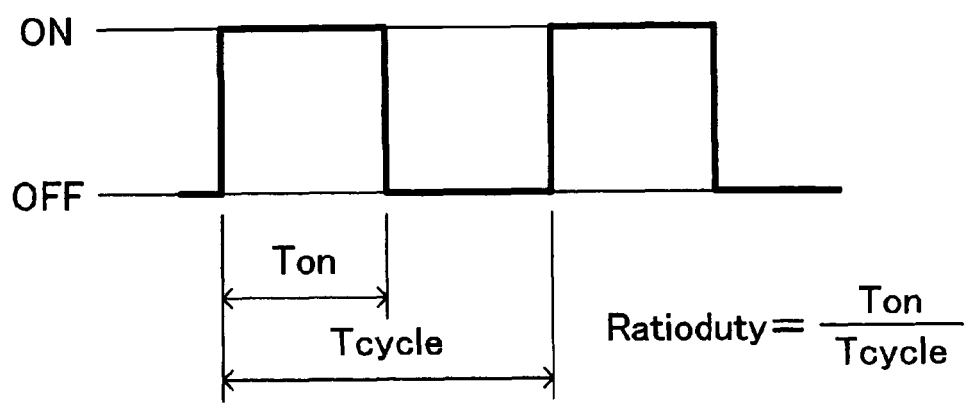
FIG. 4 is a view illustrating a power supply pattern when a duty cycle control is performed on the command current.

According to the aforementioned structure, the command current value Id** of the pressure-intensifying valve PU* * is controlled by the CPU 51. Specifically, as illustrated in FIG. 4, the CPU 51 adjusts a ratio of a power supply time (ON time) Ton for the pressure-intensifying valve PU relative to one cycle time Tcycle (i.e., duty ratio Ratioduty=Ton/Tcycle) so as to control an average (effective) current (=command current value Id). Since the duty ratio Ratioduty is adjusted individually for each wheel (i.e., duty control), the command current value Id** can be individually controlled for each wheel in a linearly variable manner.

The aforementioned brake hydraulic pressure controlling unit 30 (precisely, the CPU 51) performs a known anti-lock brake system (ABS) control for preventing excess skidding of wheels that may be caused by the depression of the brake pedal BP by a driver. According to the present embodiment, when a predetermined ABS control start condition is satisfied, the ABS control that consists of a combination of the aforementioned pressure-reducing control, the hold control, and the linear pressure-intensifying control is performed multiple times until a predetermined ABS control end condition is satisfied.

Next, a control of a rotational speed of the motor MT performed by the brake apparatus 10 including the apparatus for controlling a pump driving motor according to the present embodiment having the aforementioned structure will now be explained below. The brake apparatus 10 starts to control a rotational speed of the motor MT when a motor control start condition is satisfied, until a motor control end condition is satisfied (that will be explained later) by using a power transistor Tr serving as a switching element, as illustrated in FIG. 5, incorporated in the electronic control unit 50.

Specifically, the power transistor Tr includes a collector terminal connected to a power supply of a vehicle (i.e., voltage Vcc that is equal to 12V according to the present embodiment) and an emitter terminal connected to one terminal of the motor MT. The other terminal of the motor MT is earthed (i.e., voltage GND). The power transistor Tr also includes a base terminal to which a motor control signal Vcont that is generated through a command of the brake apparatus 10 (precisely, CPU 51) is applied.

Figure 5:
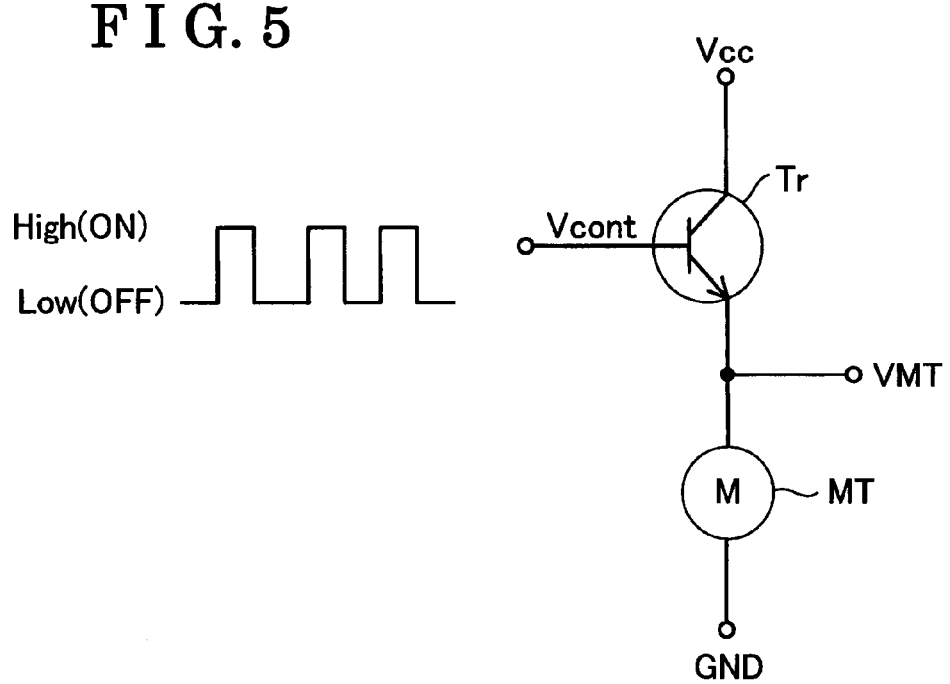
FIG. 5 is a schematic view of a drive circuit for controlling to drive the motor.

As illustrated in FIG. 5, the motor control signal Vcont is generated to be in either a High level or a Low level. The power transistor Tr turns to an ON state when the motor control signal Vcont is in the High level while turns to an OFF state when the motor control signal Vcont is in the Low level. That is, the motor MT receives the voltage Vcc when the motor control signal Vcont is in the High level to thereby drive the hydraulic pumps HPf and HPr (i.e., power supply to the motor MT is in an ON state, which will be hereinafter simply referred to as an "ON state"). On the other hand, the motor MT does not receive the voltage Vcc when the motor control signal Vcont is in the Low level (i.e., power supply to the motor MT is in an OFF state, which will be hereinafter simply referred to as an "OFF state").

Accordingly, a motor terminal voltage VMT that indicates a voltage between two terminals of the motor MT (see FIG. 5) is constant at the voltage Vcc when the motor MT is in the ON state. On the other hand, when the motor MT is in the OFF state, the motor terminal voltage VMT shows a voltage that the motor MT is generating. That is, the motor MT serving as a generator generates a voltage (i.e., generation voltage) from an induction electromotive power. The generation voltage decreases in response to the decrease of the rotational speed of the motor MT that rotates because of inertia, and turns to zero when the rotational speed becomes zero.

Figure 6:
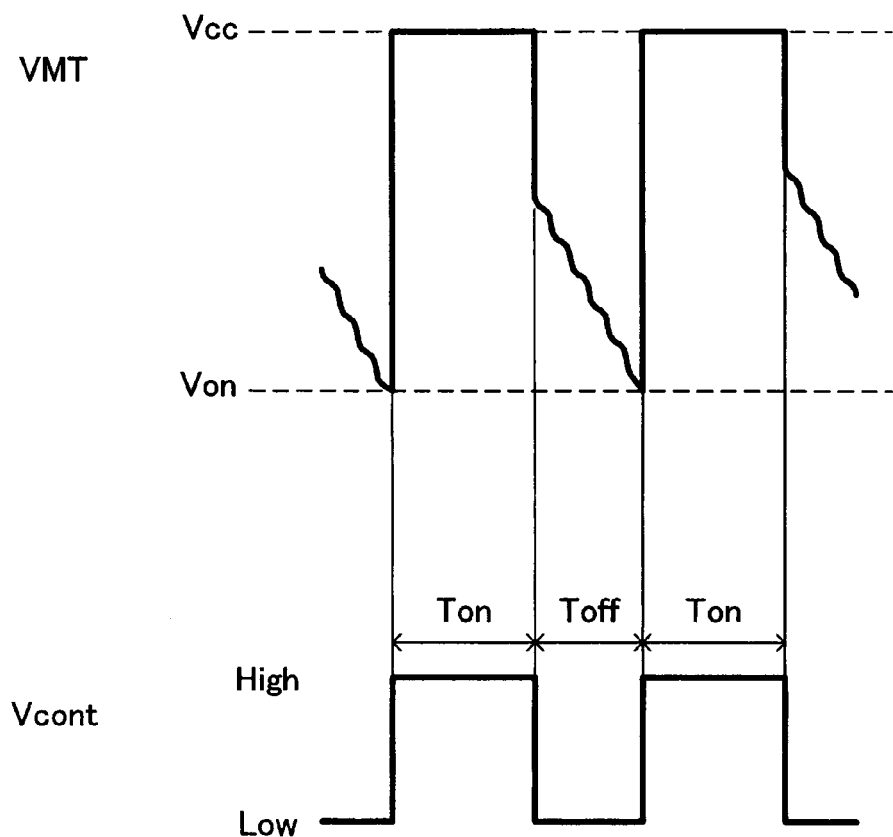
FIG. 6 is a graph showing an example of a motor drive pattern.

As illustrated in FIG. 6, the motor MT is switched from the OFF state to the ON state when the motor terminal voltage VMT falls to or below a voltage threshold value Von (to be explained later) in response to the decrease of the rotational speed of the motor MT that rotates because of the inertia while the motor MT is in the OFF state. Then, the motor MT is retained in the ON state over the ON time Ton (to be explained later) so as to drive the hydraulic pumps HPf and HPr. Afterwards, the motor MT is switched from the ON state to the OFF state to thereby stop driving the hydraulic pumps HPf and HPr.

When the motor control start condition is satisfied, a drive pattern of the motor MT, (i.e., motor drive pattern) constituted by the voltage threshold value Von and the ON time Ton is repeatedly applied until the motor control end condition is satisfied to thereby perform an ON/OFF control on the power supply to the motor MT and to thereby control the rotational speed of the motor MT (and thus the rotational speed of the hydraulic pumps HPf and HPr). A time period during which the motor MT is retained in the OFF state will be hereinafter referred to as an "OFF time Toff" (see FIG. 6).

Figure 7:
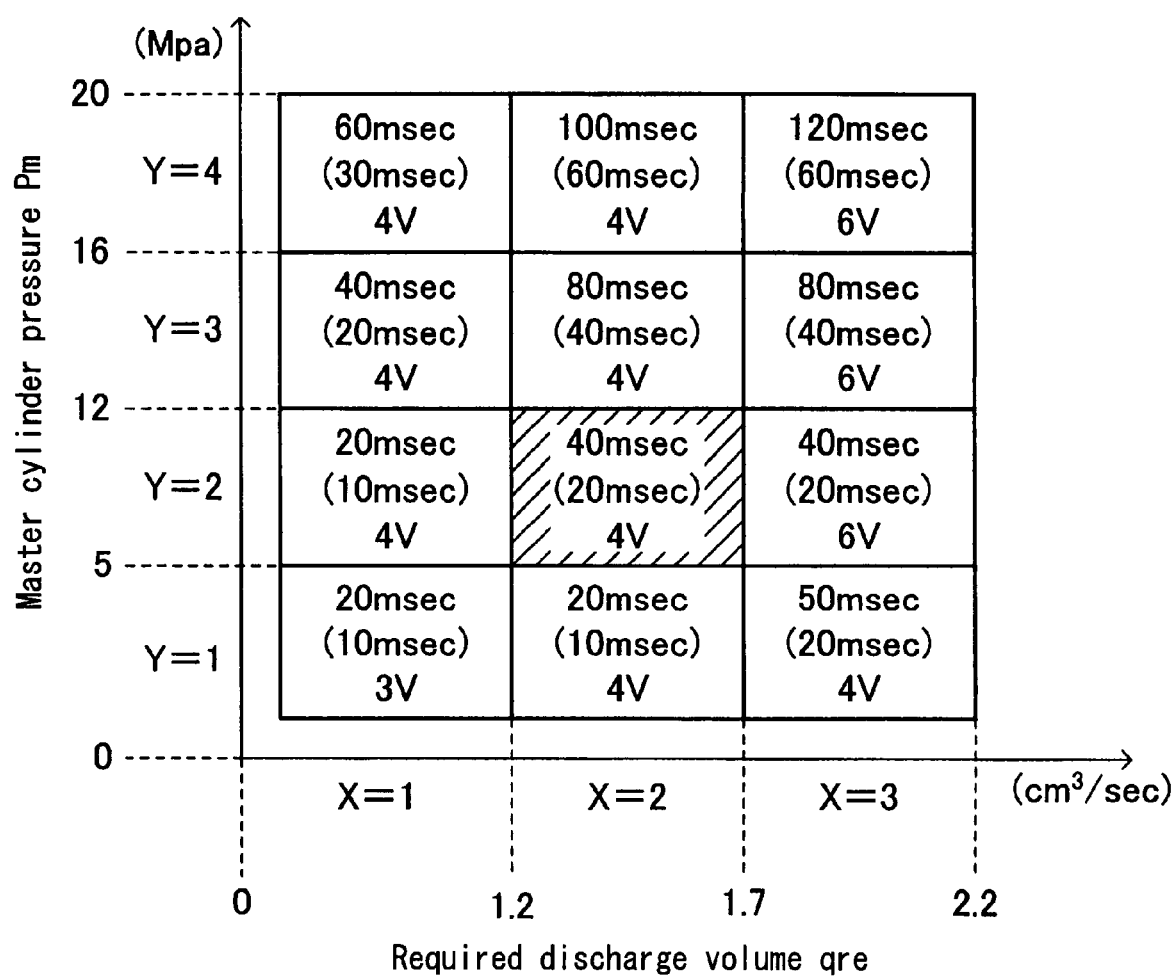
FIG. 7 is a table used for determining a motor base drive pattern.

The motor drive pattern (i.e., voltage threshold value Von and ON time Ton) is basically determined according to a table MAP (X, Y) illustrated in FIG. 7. The pattern determined on the basis of the table in FIG. 7 will be hereinafter referred to as a "basic motor drive pattern", which corresponds to a rotational speed of the motor MT defined by a hydraulic pump controlling means. A value X (=1, 2, and 3) is selected on the basis of a required discharge volume qre while a value Y (=1, 2, 3, and 4) is selected on the basis of a master cylinder pressure estimated value Pm (to be explained later). For example, in the case of X=2 and Y=2 (see a shaded box in FIG. 7), the voltage threshold value Von is defined to be 4V while the ON time Ton is defined to be 40 msec.

The required discharge volume qre (cm³/sec) is obtained by dividing an estimated value Q (cm³) of a reservoir fluid volume (i.e., total brake fluid volume in the reservoir RSf and RSr) at the end of the pressure-reducing control, i.e., a value Q1, by a target time Ttrg1 (sec) (fixed value). The reservoir fluid volume is calculated and updated in a manner to be explained later. The estimated value Q is obtained by an estimated fluid volume obtaining means. A-relation of qre=Q1/Ttrg1 can be acquired accordingly. The target time Ttrg1 is a control target of a time period from the end of the pressure-reducing control to a point where the reservoir fluid amount turns to zero. That is, the required discharge volume qre is a total fluid discharge volume of the hydraulic pumps HPf and HPr (i.e., fluid discharge volume per time unit) required to eliminate the reservoir fluid, that shows a maximum value at the end of the pressure-reducing control, after a lapse of the target time Ttrg1 from the end of the pressure-reducing control. The required discharge volume qre is updated in a step manner at each end of the pressure-reducing control and is defined to be lager when the value Q1 is larger.

As is understood from FIG. 7, when the required discharge volume qre is large (and thus the reservoir fluid estimated value Q is large) or the master cylinder pressure estimated value Pm is large, the basic motor drive pattern in which an average power supply to the motor MT is large, i.e., specifically, the voltage threshold value Von is large or the ON time Ton is long, is specified. This is because, as explained in the aforementioned background section, the rotational speed of the motor MT should be defined to be high when the reservoir fluid volume is large. In addition, the rotational speed of the motor MT decreases when the master cylinder pressure increases in a state where the motor drive pattern is fixed.

Further, the basic motor drive pattern has been specified on the assumption that the fluid discharge volume of the hydraulic pumps HPf and HPr in the case that the motor MT is driven by one motor drive pattern (which may be hereinafter simply referred to as a "drive discharge volume") is equal to a value that should be guaranteed in view of design and that has been determined by considering deterioration, and the like, of the motor MT and the hydraulic pumps HPf and HPr (i.e., minimum guaranteed discharge volume). Values of time shown in parentheses in FIG. 7 each show the ON time Ton for the basic motor drive pattern that has been decided on the assumption that the drive discharge volume is equal to a design middle value (i.e., nominal discharge volume) and will be hereinafter referred to as a "nominal ON time Tonnom".

Accordingly, the ON time Ton corresponding to the minimum guaranteed discharge volume (for example, 40 msec in the shaded box in FIG. 7) is longer than the nominal ON time Tonnom (for example, 20 msec in the shaded box in FIG. 7) corresponding to the nominal discharge volume. This is because the average power supply to the motor MT required to ensure the discharge volume of the hydraulic pumps HPf and HPr increases when the drive discharge volume decreases.

According to the brake apparatus 10 of the present embodiment, the motor drive pattern (i.e., voltage threshold value Von and ON time Ton) is basically defined to be equal to the basic motor drive pattern that is determined on the basis of the table Map (X, Y) in FIG. 7. On the other hand, according to the brake apparatus 10 of the present embodiment, the motor drive pattern is defined to be different from the basic motor drive pattern under a predetermined condition.

An operation actually performed by the brake apparatus 10 according to a first embodiment will be explained with reference to flowcharts illustrated in FIGS. 8 to 15 that show routines conducted by the CPU 51 of the electronic control unit 50, and time charts illustrated in FIGS. 16 and 17.

Figure 8:
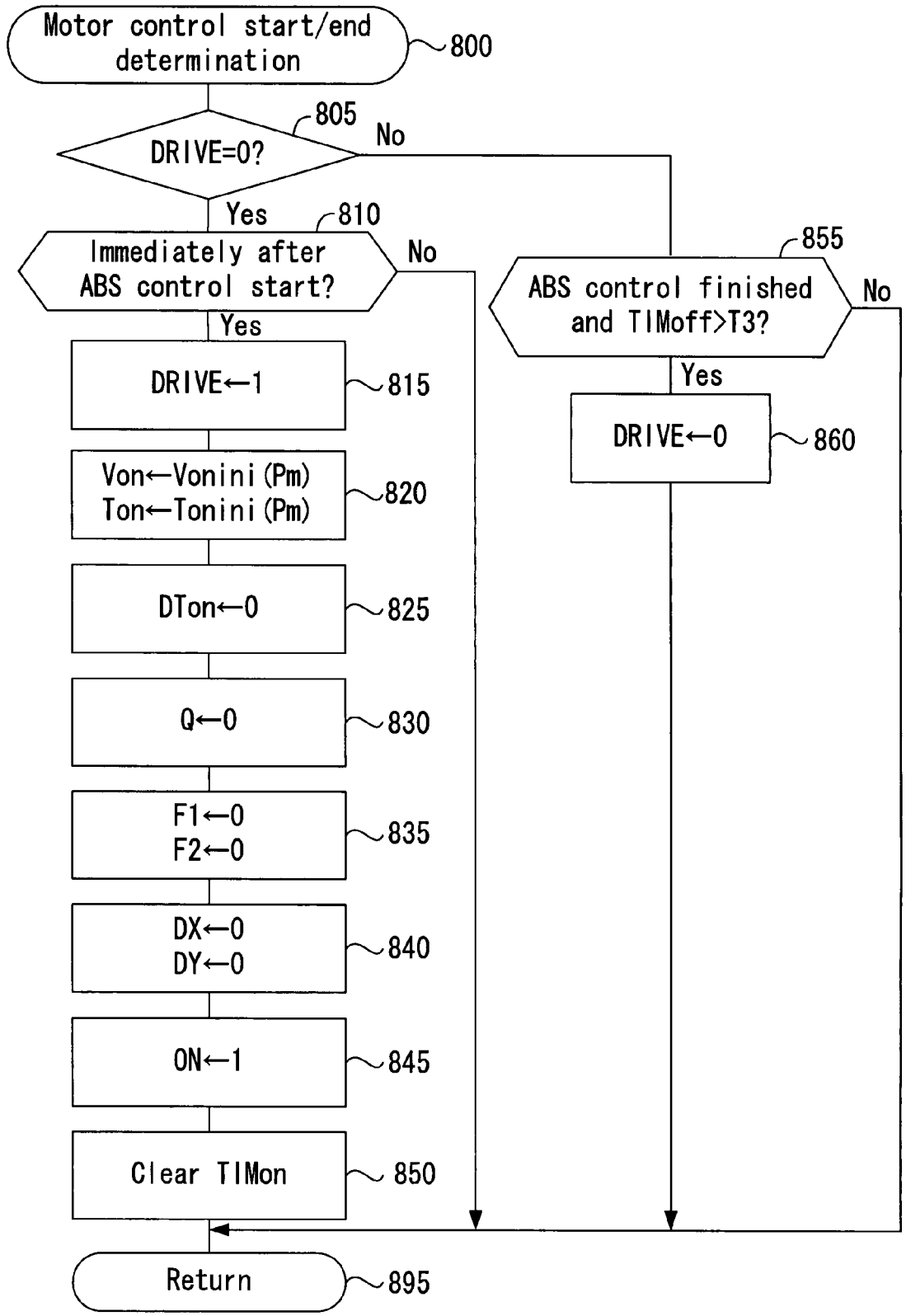
FIG. 8 is a flowchart illustrating a motor control start/end determination routine performed by a CPU provided at the brake apparatus according to a first embodiment of the present invention.

The CPU 51 repeatedly performs a motor control start/end determination routine as illustrated in FIG. 8 at a predetermined time interval. At a predetermined timing, the CPU 51 starts the routine from step 800. The routine then proceeds to step 805 to determine whether or not a value of a flag DRIVE is equal to zero. In this case, the value "1 (one)" of the flag DRIVE indicates that the motor MT is presently controlled (i.e., motor control is being performed) while the value "0 (zero)" of the flag DRIVE indicates that the motor MT is not presently controlled (i.e., motor control is not being performed).

In the cases where the motor control is not presently performed and the motor control start condition is not satisfied (i.e., before a time t1 in FIG. 16), the value of the flag DRIVE is zero. Thus, the positive determination (i.e., "YES") is made in step 805 and then the routine proceeds to step 810 where it is determined whether or not the motor control start condition is satisfied. According to the first embodiment, the motor control start condition is satisfied when the ABS control is started.

At this time, since the motor control start condition is not satisfied as described in the above, the negative determination (i.e., "NO") is made in step 810 and the routine immediately proceeds to step 895 so that the present routine can be terminated. Such operation is repeated until the motor control start condition is satisfied.

In the cases where the ABS control is started from the aforementioned state (i.e., motor control start condition is satisfied) (see the time t1 in FIG. 16), the positive determination is made in step 810 and then the routine proceeds to step 815 in which the value of the flag DRIVE is changed from zero to one.

Next, the routine proceeds to step 820 where the voltage threshold value Von and the ON time Ton are defined to be initial values, respectively, which are determined through a function Vonini and a function Tonini of which each argument is the master cylinder pressure estimated value Pm. The master cylinder pressure estimated value Pm is sequentially updated over the ABS control by repeating a routine (not shown) that is one of known methods. For example, the master cylinder pressure estimated value Pm can be calculated by estimating the wheel cylinder pressure and a differential pressure between the master cylinder pressure and the wheel cylinder pressure based on the open/closed state of the pressure-intensifying valve PU and the pressure-reducing valve PD, and the command current value Id of the pressure-intensifying valve PU, and by adding the acquired differential pressure estimated value to the acquired wheel cylinder pressure estimated value Pw. Details of such method are disclosed in JP09-267736A, and the like. The method for acquiring the master cylinder pressure estimated value Pm in the aforementioned manner corresponds to an estimated master cylinder pressure value obtaining means.

The routine then proceeds to step 825 in which an ON time reduction value DTon is defined to be zero as an initial value. In the same way, the CPU 51 defines the reservoir fluid estimated value Q to be zero as an initial value in step 830, defines flags F1 and F2 to be zero as an initial value in step 835, and then defines an X reduction amount DX and a Y reduction amount DY to be zero in step 840. At this time, DTon, F1, F2, DX, and DY are values used for defining the motor drive pattern to be different from the basic motor drive pattern and will be explained later.

The routine proceeds to step 845 in which a flag ON is set to one as an initial value. Then, the routine proceeds to step 850 to clear an ON duration time TIMon. Afterwards, the routine proceeds to step 895 so that the present routine can be terminated. The value "1 (one)" of the flag ON indicates that the motor MT is in the ON state while the value "0 (zero)" of the flag ON indicates that the motor MT is in the OFF state. The ON duration time TIMon is measured by a timer (not shown) incorporated in the electronic control unit 50 and indicates a duration time of the ON state of the motor MT.

Afterwards, since the value of the DRIVE is set to one, the negative determination is made in step 805. Next, in step 855, it is determined whether or not the motor control end condition is satisfied. According to the first embodiment, the motor control end condition is satisfied when the ABS control is finished and an OFF duration time TIMoff exceeds a time period T3, which will be explained later. The OFF duration time TIMoff is measured by a timer (not shown) incorporated in the electronic control unit 50 and indicates a duration time of the OFF state of the motor MT.

At this moment, the motor control end condition is not satisfied as immediately after the start of the motor control. Thus, the negative determination is made in step 855 and the routine immediately proceeds to step 895 so that the present routine can be terminated. Such process is repeated until the motor control end condition is satisfied.

On the other hand, in the cases where the motor control end condition is satisfied from the aforementioned state, the positive determination is made in step 855 and the routine proceeds to step 860 in which the value of the flag DRIVE is changed from one to zero. Accordingly, since then, the positive determination is made in step 805 and the routine proceeds to step 810 to monitor again whether or not the motor control start condition is satisfied.

Accordingly, because the routine in FIG. 8 is repeatedly performed, the aforementioned various values are each set to the initial value immediately after the motor control start condition is satisfied and the ON duration time TIMon is cleared. In addition, the value of the flag DRIVE is retained at one while the motor control is being performed and is retained at zero while the motor control is not being performed.

Figure 9:
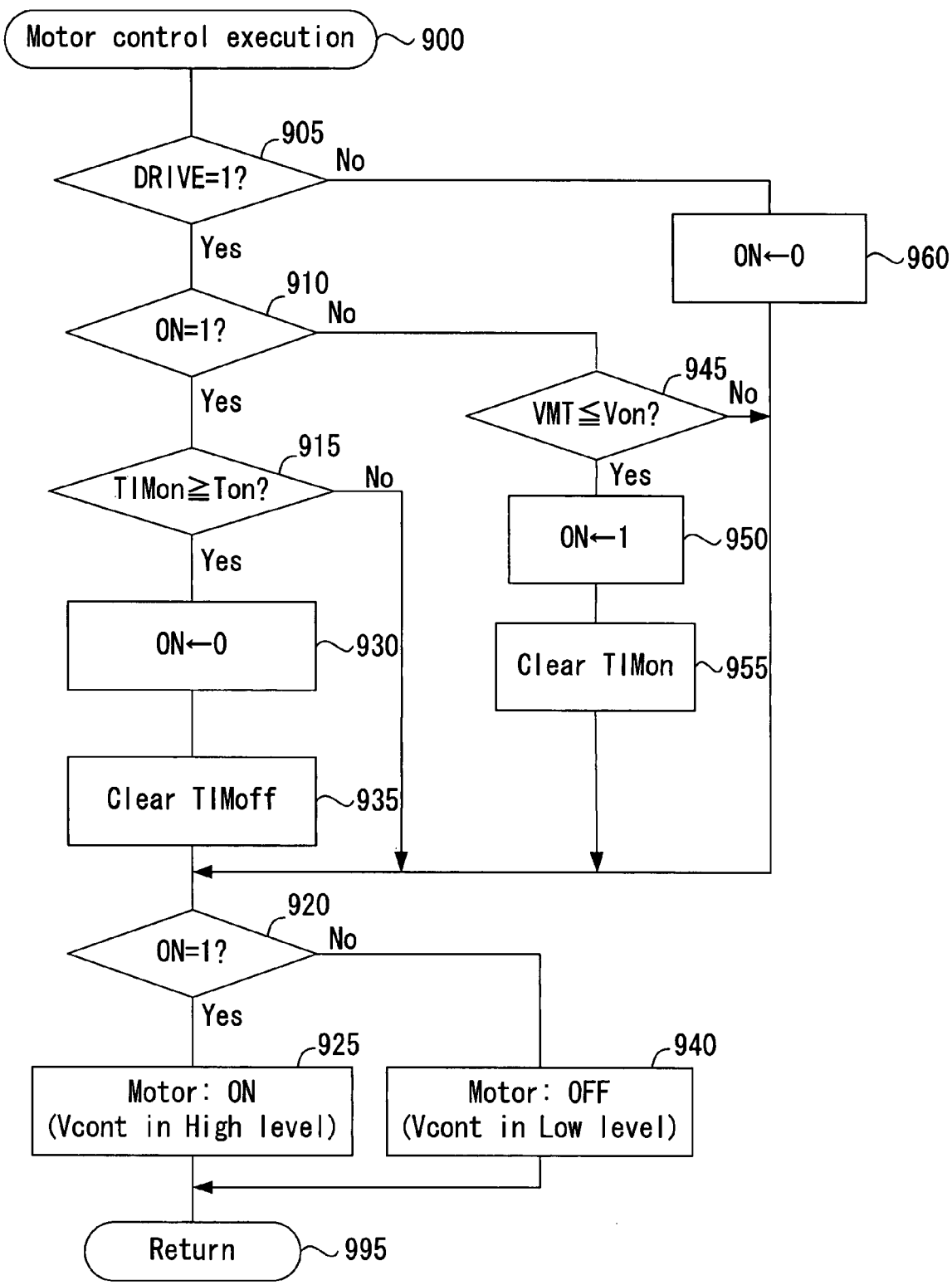
FIG. 9 is a flowchart illustrating a motor control execution routine performed by the CPU according to the first embodiment of the present invention.

The CPU 51 also repeatedly performs a motor control execution routine at a predetermined time interval as illustrated in FIG. 9. At a predetermined timing, the CPU 51 starts the routine from step 900. The routine then proceeds to step 905 to determine whether or not the value of the flag DRIVE is equal to one.

In the cases where the motor control has just started (see the time t1 in FIG. 16), the flag DRIVE is set to one in step 815 and the flag ON is set to one in step 845 as mentioned above. In addition, the ON duration time TIMon is cleared in step 850. Thus, the positive determination is made in step 905 and the routine proceeds to step 910 to determine whether or not the value of the flag ON is equal to one. The positive determination is made in step 910 and the routine proceeds to step 915.

In step 915, it is determined whether or not the ON duration time TIMon is equal to or greater than the ON time Ton (which is set to the initial value in step 820). At this moment, the ON duration time TIMon is just cleared and thus is smaller than the ON time Ton. Therefore, the negative determination is made in step 915 and the routine proceeds to step 920.

The CPU 51 determines whether or not the flag ON is set to one in step 920. The positive determination is made in step 920 and then the routine proceeds to step 925 so as to bring the motor MT in the ON state (precisely, to set the motor control signal Vcont in the High level). Such process is repeated until the condition in step 915 is satisfied. Accordingly, the motor terminal voltage VMT is retained at the voltage Vcc and the hydraulic pumps HPf and HPr continue to be driven (i.e., after the time t1 in FIG. 16).

On the other hand, in the cases where the ON duration time TIMon reaches the ON time Ton from the aforementioned state (see a time t3 in FIG. 16), the positive determination is made in step 915. The routine then proceeds to step 930 in which the value of the flag ON is changed from one to zero. Next, in step 935, the OFF duration time TIMoff is cleared. The negative determination is made in step 920 and the routine proceeds to step 940 so as to bring the motor MT in the OFF state (precisely, to set the motor control signal Vcont in the Low level). Accordingly, the driving of the hydraulic pumps HPf and HPr is stopped.

Afterwards, since the flag ON is set to zero, the negative determination is made in step 910 and then the routine proceeds to step 945 to determine whether or not the motor terminal voltage VMT is equal to or smaller than the voltage threshold value Von (which is set to the initial value because of the process in step 820 at this point).

At this moment, the motor terminal voltage VMT is greater than the voltage threshold value Von as immediately after the motor MT is changed from the ON state to the OFF state. Thus, the negative determination is made in step 945 and the routine proceeds to step 920 and step 940 to retain the motor MT in the OFF state. Such process is repeated until the motor terminal voltage VMT that decreases along the decrease of the rotational speed of the motor MT while the motor MT is in the OFF state reaches the voltage threshold value Von.

When the motor terminal voltage VMT reaches the voltage threshold value Von (see a time t4 in FIG. 16), the positive determination is made in step 945 and then the routine proceeds to step 950 to change the value of the flag ON from zero to one. After the CPU 51 clears the ON duration time TIMon in step 955, the routine proceeds to step 920 and then step 925 to retain the motor MT in the ON state again. Accordingly, the hydraulic pumps HPf and HPr start to be driven, again.

Afterwards, since the flag ON is set to one, the positive determination is made in step 910 so that it can be monitored again whether the condition in step 915 is satisfied. As a result, the hydraulic pumps HPf and HPr are kept driven again until the condition of step 915 is satisfied (i.e., after the time t4 in FIG. 16).

Accordingly, because the routine in FIG. 9 is repeatedly performed, the motor MT is ON/OFF controlled by the motor drive pattern constituted by the voltage threshold value Von and the ON time Ton to thereby control the rotational speed of the motor MT (and thus the rotational speed of the hydraulic pumps HPf and HPr). According to the first embodiment, the motor drive pattern is updated each time the motor MT is changed from the OFF state to the ON state (which will be hereinafter referred to as a "motor ON"). In addition, the value of the flag ON is retained at "1 (one)" when the motor MT is in the ON state and is retained at "0 (zero)" when the motor MT is in the OFF state.

In the cases where the flag DRIVE is equal to zero (i.e., motor control is not presently performed), the negative determination is made in step 905 and the routine proceeds to step 960 in which the flag ON is set to zero. Afterwards, the routine proceeds to step 920 and step 940 so as to retain the motor MT in the OFF state.

Figure 10:
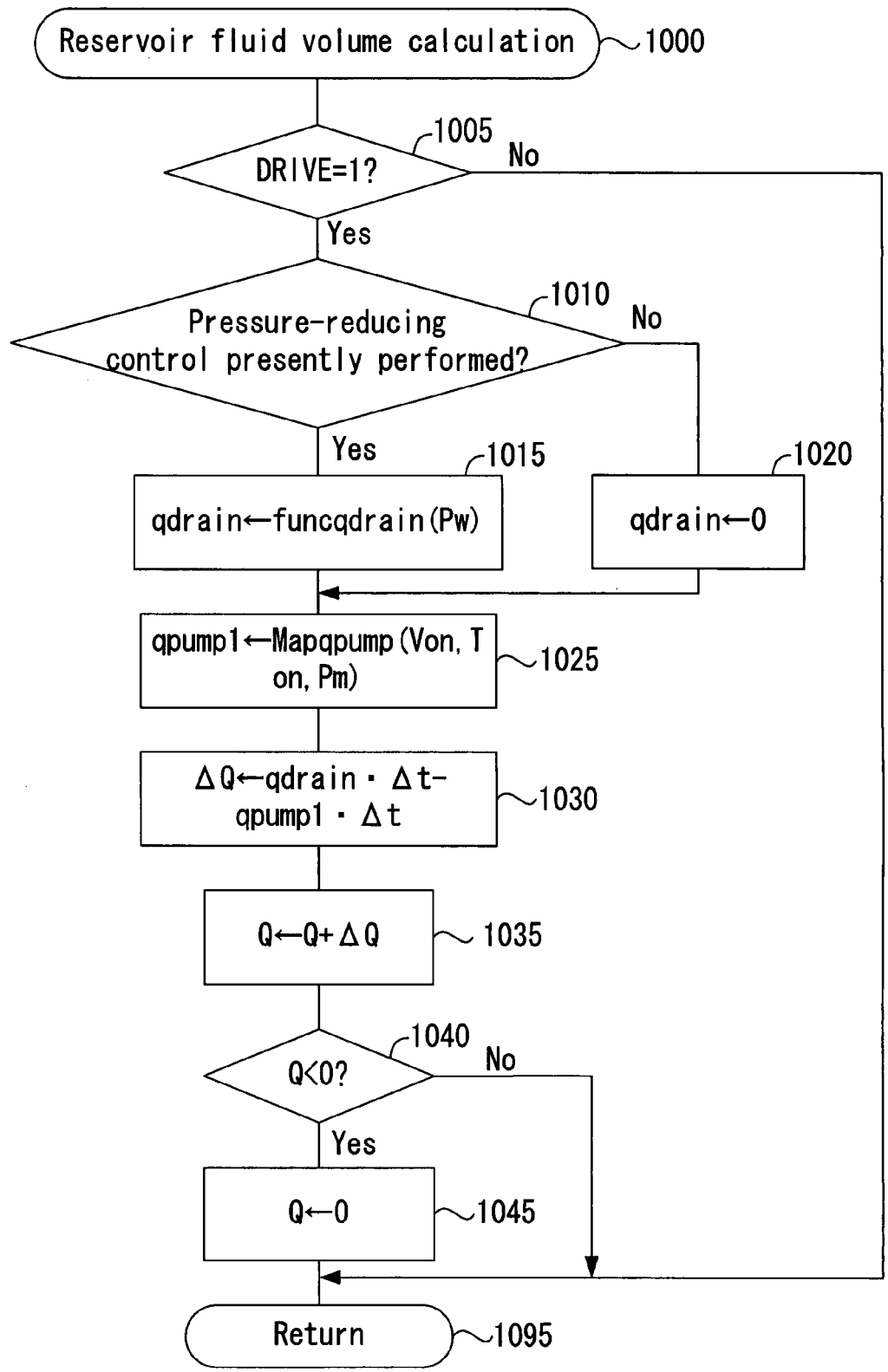
FIG. 10 is a flowchart illustrating a reservoir fluid volume calculation routine performed by the CPU according to the first embodiment of the present invention.

The CPU 51 further repeatedly performs a reservoir fluid volume calculation routine at a predetermined time interval (i.e., program execution period Δt) as illustrated in FIG. 10. In the following, the reservoirs RSf and RSr may be each simply referred to as the "reservoir". At a predetermined timing, the CPU 51 starts the routine from step 1000. The routine then proceeds to step 1005 to determine whether or not the value of the flag DRIVE is equal to one. When it is determined that the value is not equal to one, the routine proceeds to step 1095 so that the present routine can be terminated.

In the cases where the motor control is presently performed (i.e., after the time t1 in FIG. 16), the flag DRIVE is set to one in step 815 as mentioned above. Thus, the positive determination is made in step 1005 and the routine proceeds to step 1010 in which it is determined whether or not the pressure-reducing control is presently performed.

In the cases where the pressure-reducing control is presently performed (see a time period from t1 to t2, or t8 to t9 in FIG. 16), the positive determination is made in step 1010 and the routine proceeds to step 1015 to obtain a discharge volume qdrain based on the wheel cylinder pressure estimated value Pw and a function funcqdrain of which an argument is Pw. The discharge volume qdrain is the volume of brake fluid discharged from the pressure-reducing valve PD and flows into the reservoir during the pressure-reducing control (i.e., pressure-reducing valve PD is in the open state). The discharge volume qdrain can be calculated on the basis of the wheel cylinder pressure and an open area (which is fixed) of the pressure-reducing valve PD in the open state and therefore can be obtained from the function of the wheel cylinder pressure Pw. When the pressure-reducing control is performed simultaneously on two or more of the wheels, the discharge volume qdrain is a sum of the discharge volume for those wheels.

Meanwhile, in the cases where the pressure-reducing control is not presently performed (i.e., the hold control or the linear pressure-intensifying control is presently performed) (see a time period from t2 to t8, or t9 to t14 in FIG. 16), the negative determination is made in step 1010 and the routine proceeds to step 1020 in which the discharge volume qdrain is defined to be zero. This is based on a fact that the pressure-reducing valve PD** is retained in the closed state during the hold control or the linear pressure-intensifying control.

Next, the routine proceeds to step 1025 to obtain a discharge volume qpump1 of the hydraulic pumps HPf and HPr based on the present motor drive pattern (i.e., Von and Ton), the master cylinder pressure estimated value Pm, and a table Mapqpump of which arguments are Von, Ton, and Pm. The discharge volume qpump1 depends on the rotational speed of the hydraulic pumps HPf and HPr, and the master cylinder pressure. The discharge volume qpump1 is large when the rotational speed is high while the discharge volume qpump1 is small when the master cylinder pressure is large. Accordingly, the discharge volume qpump1 can be obtained on the basis of the motor drive pattern and the master cylinder pressure estimated value Pm.

According to the present embodiment, the table Mapqpump is created on the assumption that the drive discharge volume is equal to the minimum guaranteed discharge volume. That is, the discharge volume qpump1 is calculated in such a way to correspond to the minimum guaranteed discharge volume.

The routine proceeds to step 1030 in which a variation ΔQ of the reservoir fluid estimated value Q per program execution period Δt is obtained based on a formula below. In this case, "qdrain·Δt" corresponds to the brake fluid volume flowing into the reservoir per program execution period Δt while "qpump1·Δt" corresponds to the brake fluid volume sucked by the hydraulic pumps HPf and HPr from the reservoir.

Formula: $\Delta Q = q\text{drain} \cdot \Delta t - q\text{pump}1 \cdot \Delta t$ The routine then proceeds to step 1035 in which the reservoir fluid estimated value Q is updated by adding the variation ΔQ obtained in step 1030 to the present reservoir fluid estimated value (which is set to the initial value, i.e., zero, in step 830 as immediately after the start of the ABS control, i.e., the motor control).

Next, the routine proceeds to step 1040 in which it is determined whether or not the updated reservoir fluid estimated value Q is a negative value. When the negative determination is made, the routine immediately proceeds to step 1095. On the other hand, when the positive determination is made, the routine proceeds to step 1045 in which the reservoir fluid estimated value Q is set to zero. The routine then proceeds to step 1095 so that the present routine can be terminated.

Accordingly, because the routine in FIG. 10 is repeatedly performed, the reservoir fluid estimated value Q can be updated per program execution period Δt based on the brake fluid volume discharged from the pressure-reducing valve PD and the brake fluid volume sucked by the hydraulic pumps HPf and HPr. Therefore, as illustrated in FIG. 16**, the reservoir fluid estimated value Q ($\geq$0) increases during the pressure-reducing control (i.e., a time period from t1 to t2, t8 to t9, or the like) on the basis of a relation of qdrain>qpump1. On the other hand, the reservoir fluid estimated value Q decreases during the hold control or the linear pressure-intensifying control (i.e., a time period from t2, to t8, t9 to t14, or the like) as qdrain is retained to be zero. The method for obtaining the reservoir fluid estimated value Q corresponds to an estimated fluid volume obtaining means.

Since the drive discharge volume is practically greater than the minimum guaranteed discharge volume, the actual discharge volume of the hydraulic pumps HPf and HPr is practically greater than the discharge volume qpump1. Thus, as illustrated in FIG. 16, a decreasing gradient of an actual value Qact of the reservoir fluid volume (see a dotted line) is greater than a decreasing gradient of the reservoir fluid estimated value Q during the hold control or the linear pressure-intensifying control (i.e., a time period from t2 to t8, t9 to t14, or the like). That is, according to the first embodiment, the reservoir fluid estimated value Q tends to be calculated larger than the actual value Qact.

Figure 11:
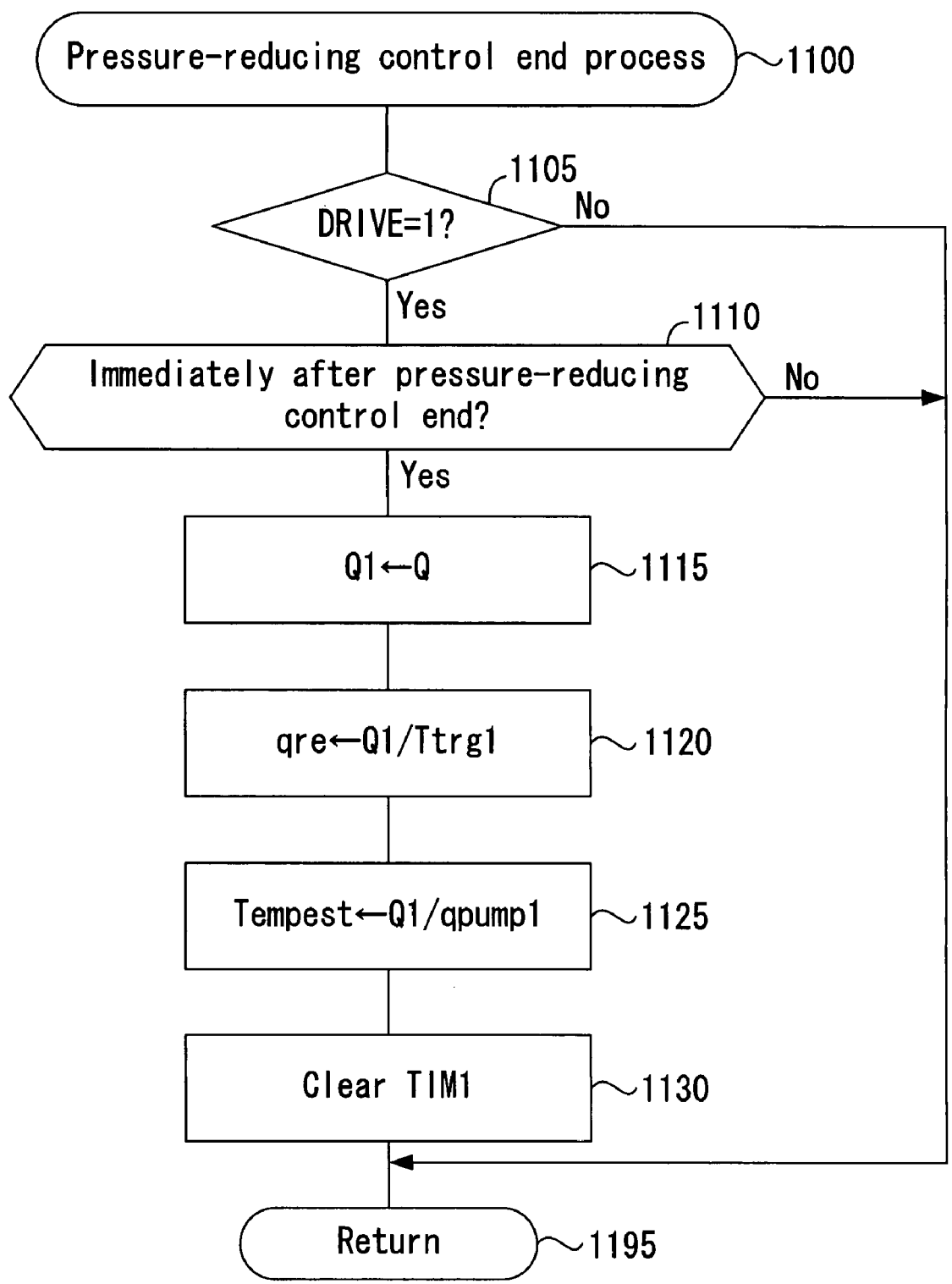
FIG. 11 is a flowchart illustrating a routine for performing a pressure-reducing control end process performed by the CPU according to the first embodiment of the present invention.

Furthermore, the CPU 51 repeatedly performs a routine for conducting a pressure-reducing control end process at the predetermined time interval (i.e., program execution period Δt) as illustrated in FIG. 11. At a predetermined timing, the CPU 51 starts the routine from step 1100. The routine then proceeds to step 1105 in which it is determined whether or not the value of the flag DRIVE is equal to one. When the negative determination is made, the routine proceeds to step 1195 so that the present routine can be terminated.

In the cases where the present time is immediately after the completion of the pressure-reducing control (see the time t2, t9, or the like, in FIG. 16), the flag DRIVE is equal to one. Thus, the positive determination is made in step 1105 and the routine proceeds to step 1110 in which it is determined whether or not the present time is immediately after the completion of the pressure-reducing control. When the negative determination is made, the routine proceeds to step 1195 so that the present routine can be terminated.

Since the present time is immediately after the pressure-reducing control, the positive determination is made in step 1110 and the routine proceeds to step 1115 in which the value Q1 is specified to be the reservoir fluid estimated value Q obtained at that time, i.e., at the end of the pressure-reducing control. Next, in step 1120, the required discharge volume qre is specified to be a value acquired by dividing the value Q1 by the target time Ttrg1.

The routine proceeds to step 1125 in which an empty estimated time Tempest is obtained by dividing the value Q1 by the discharge volume qpump1 at that point. The empty estimated time Tempest corresponds to a time period from the end of the pressure-reducing control (for example, the time t2) to a point where the reservoir fluid volume is assumed to become empty (for example, a time t10).

In step 1130, a duration time TIM1 is cleared and the routine proceeds to step 1195 so that the present routine can be terminated. In this case, the duration time TIM1 is measured by a timer (not shown) incorporated in the electronic control unit 50 and represents an elapsed time from the latest end point of the pressure-reducing control. The empty estimated time Tempest and the duration time TIM1 are used when the motor drive pattern is defined to be different from the motor base drive pattern and will be explained later in detail.

Accordingly, because the routine in FIG. 11 is repeatedly performed, each time the pressure-reducing control is completed, the value Q1, the required discharge volume qre, and the empty estimated time Tempest are updated in a step manner and the duration time TIM1 is cleared.

Figure 12:
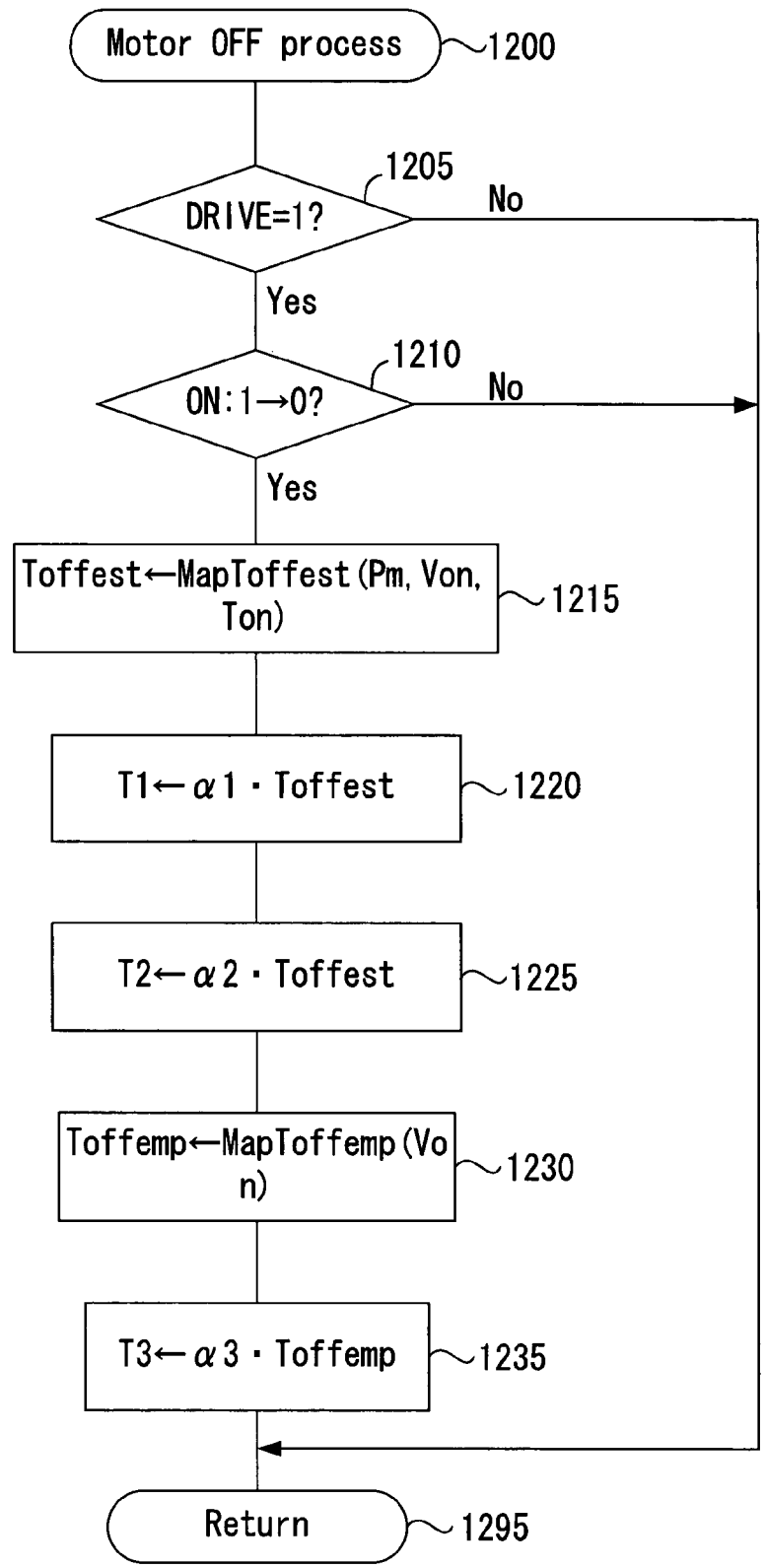
FIG. 12 is a flowchart illustrating a routine for performing a motor OFF process according to the first embodiment of the present invention.

The CPU 51 further repeatedly performs a routine for conducting a motor OFF process (i.e., a process conducted when the motor MT is switched from the ON state to the OFF state) at the predetermined time interval (i.e., program execution period Δt) as illustrated in FIG. 12. At a predetermined timing, the CPU 51 starts the routine from step 1200. The routine then proceeds to step 1205 in which it is determined whether or not the value of the flag DRIVE is equal to one. When the negative determination is made, the routine proceeds to step 1295 so that the present routine can be terminated.

In the cases where the motor MT has just been switched to the OFF state from the ON state (see the time t3, t6, t12, or the like), the flag DRIVE is equal to one and thus the positive determination is made in step 1205. The routine then proceeds to step 1210 in which it is determined whether or not the value of the flag ON is changed from one to zero. When the negative determination is made, the routine immediately proceeds to step 1295 so that the present routine can be terminated.

Since the present time is immediately after the value of the flag ON is changed from one to zero, the positive determination is made in step 1210. The routine then proceeds to step 1215 in which an OFF estimated time Toffest that is an estimated time of the OFF time Toff started at that point is obtained on the basis of the master cylinder pressure estimated value Pm at that time, the motor drive pattern (i.e., Von and Ton), and the table MapToffest of which arguments are Pm, Von and Ton. The OFF estimated time Toffest is an estimated time of the OFF time Toff over which the reservoir fluid actual value Qact is prevented from turning to zero.

The OFF time Toff over which the reservoir fluid actual value Qact is prevented from being zero depends on the master cylinder pressure and the voltage threshold value Von. In addition, the OFF time Toff is shorter when the master cylinder pressure is larger, and also the voltage threshold value Von is larger. The OFF time Toff is shorter when the master cylinder pressure is larger because the load of the motor MT is greater when the master cylinder pressure is larger and thus the decreasing gradient of the rotational speed of the motor MT (and thus the decreasing gradient of the motor terminal voltage VMT) is larger during the OFF time Toff. The OFF estimated time Toffest can be obtained on the basis of the master cylinder pressure estimated value Pm and the voltage threshold value Von accordingly.

The routine then proceeds to step 1220 in which a time T1 is specified to be a value obtained by multiplying the OFF estimated time Toffest by a coefficient α1. Next, in step 1225, a time T2 is specified to be a value obtained by multiplying the OFF estimated time Toffest by a coefficient α2. The coefficient α1 is a positive value smaller than one, i.e., 0.5, for example, according to the present embodiment. The coefficient α2 is a positive value equal to or greater than one and near such value, i.e., 1.1, for example, according to the present embodiment.

The routine then proceeds to step 1230 in which a reservoir empty OFF time Toffemp is obtained on the basis of the voltage threshold value Von at that point and the table MapToffemp of which an argument is Von. The reservoir empty OFF time Toffemp is an estimated value of the OFF time Toff over which the reservoir fluid actual value Qact is retained to be zero.

When the reservoir fluid actual value Qact is retained to be zero over the OFF time Toff, the load of the motor MT is extremely small regardless of the master cylinder pressure level. Therefore, the decreasing gradient of the rotational speed of the motor MT during the OFF time Toff is fixed at a small value regardless of the master cylinder pressure. As a result, the OFF time Toff in this case only depends on the voltage threshold value Von. The reservoir empty OFF time Toffemp can be thus obtained on the basis of the voltage threshold value Von. The reservoir empty OFF time Toffemp is longer than the OFF estimated time Toffest.

The routine proceeds to step 1235 in which a time T3 is specified to be a value acquired by multiplying the reservoir empty OFF time Toffemp by a coefficient α3. The routine then proceeds to step 1295 so that the present routine can be terminated. The coefficient α3 is a positive value smaller than one and near such value, i.e., 0.95, for example, according to the present embodiment.

Accordingly, because the routine in FIG. 12 is repeatedly performed each time the motor MT is switched to the OFF state, the time T1, T2, T3, the OFF estimated time Toffest, and the reservoir empty OFF time Toffemp can be updated in a step manner. These values are used for determining the motor drive pattern (i.e., voltage threshold value Von and ON time Ton) to be different from the motor base drive pattern and will be explained later in detail.

Figure 13:
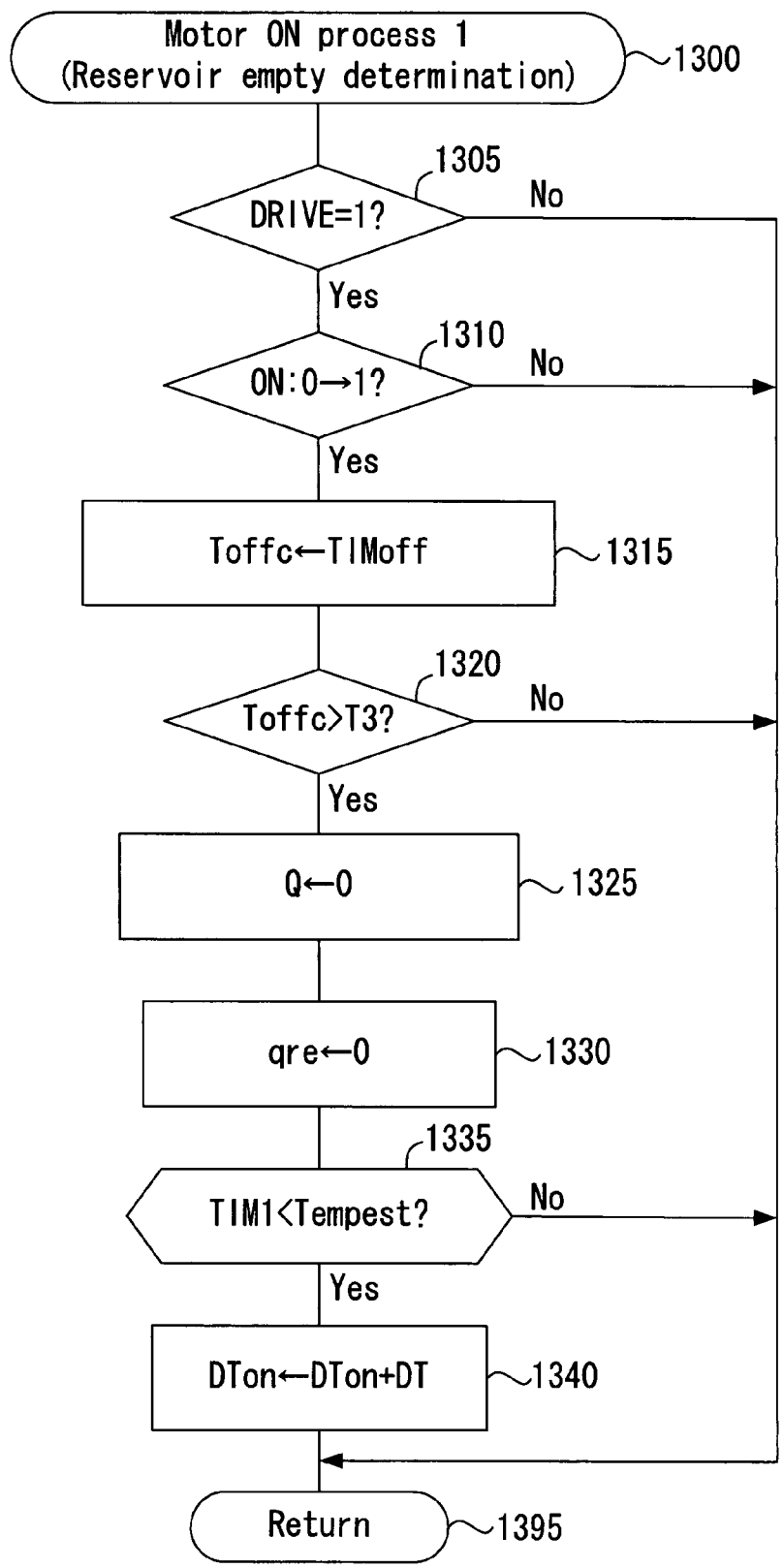
FIG. 13 is a flowchart illustrating a routine for performing a motor ON process 1 performed by the CPU according to the first embodiment of the present invention.

The CPU 51 further repeatedly performs a routine for conducting a motor ON process 1 (reservoir empty determination) at a predetermined time interval as illustrated in FIG. 13. At a predetermined timing, the CPU 51 starts the routine from step 1300. The routine then proceeds to step 1305 in which it is determined whether or not the value of the flag DRIVE is equal to one. When the negative determination is made, the routine proceeds to step 1395 so that the present routine can be terminated.

In the cases where the present time is immediately after the motor MT is switched to the ON state (see the time t4, t7, t13, or the like), the flag DRIVE is equal to one. Thus, the positive determination is made in step 1305 and the routine proceeds to step 1310 in which it is determined whether or not the value of the flag ON is changed from zero to one. When the negative determination is made, the routine immediately proceeds to step 1395 so that the present routine can be terminated.

Since the present time is immediately after the value of the flag ON is changed from zero to one because of the process in step 950, the positive determination is made in step 1310. The routine then proceeds to step 1315 in which an actual OFF time Toffc is specified to be equal to the OFF duration time TIMoff. That is, the actual OFF time Toffc is the OFF time Toff that actually continues up to this point.

Next, the routine proceeds to step 1320 in which it is determined whether or not the actual OFF time Toffc is longer than the time T3 set in step 1235. Since the time T3 is specified so as to be substantially equal to the reservoir empty OFF time Toffemp, a state where the actual OFF time Toffc is longer than the time T3 indicates that the reservoir fluid actual value Qact is retained to be zero over the OFF time Toff that continues up to this point. That is, when the condition in step 1320 is satisfied, it is determined that the reservoir is empty. The determination in step 1320 will be hereinafter referred to as a "reservoir empty determination".

In the cases where the negative determination is made in step 1320, the routine immediately proceeds to step 1395 so that the present routine can be terminated. A case where the positive determination is made in step 1320 (see a time t7 or t13) will be explained later. Accordingly, because the routine in FIG. 13 is repeatedly performed, the reservoir empty determination is performed each time the motor MT is switched to the ON state.

Figure 14:
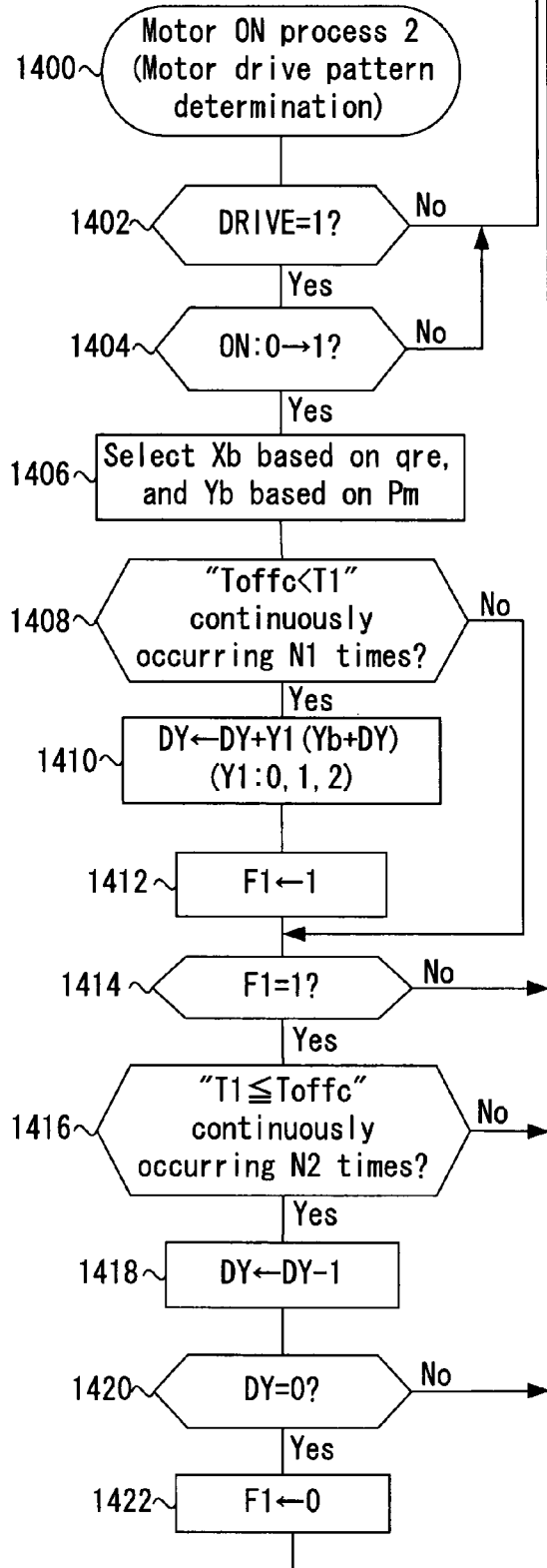
FIG. 14 is a flowchart illustrating a routine for performing a motor ON process 2 performed by the CPU according to the first embodiment of the present invention.
Figure 14:
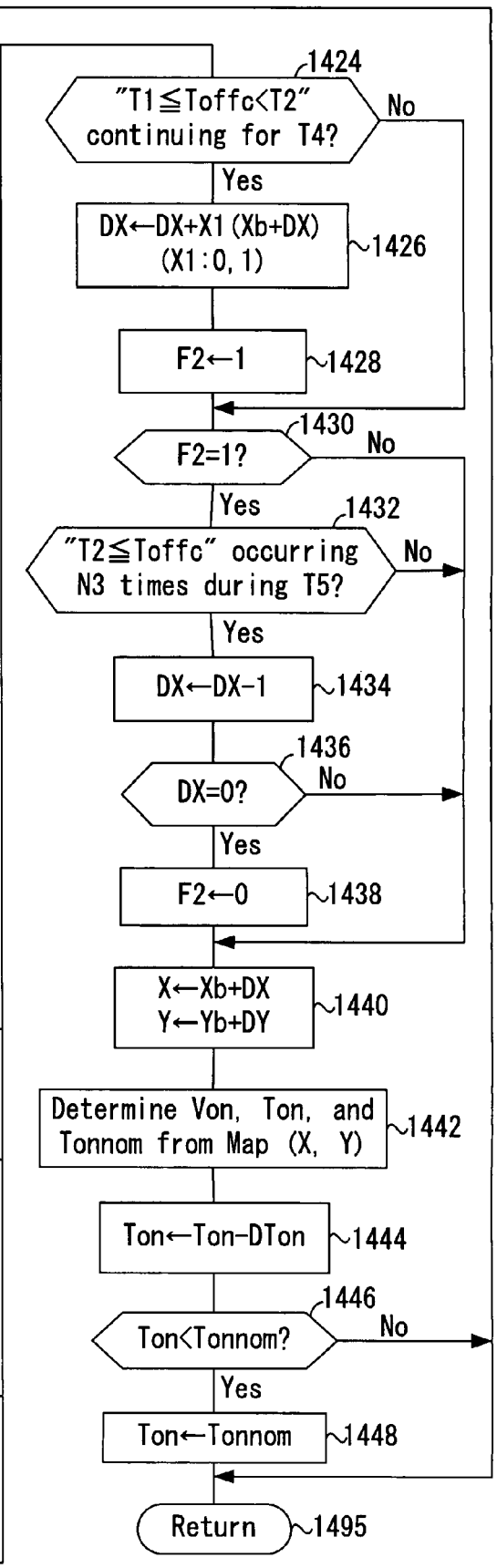

Furthermore, the CPU 51 repeatedly performs a routine for conducting a motor ON process 2 (motor drive pattern determination) as illustrated in FIG. 14 at a predetermined time interval. At a predetermined timing, the CPU 51 starts the routine from step 1400. The routine then proceeds to step 1402 in which it is determined whether or not the value of the flag DRIVE is equal to one. When the negative determination is made, the routine proceeds to step 1495 so that the present routine can be terminated.

In the cases where the present time is immediately after the motor MT is switched to the ON state (see the time t4, t7, t13, or the like), the flag DRIVE is equal to one and thus the positive determination is made in step 1402. The routine then proceeds to step 1404 in which it is determined whether or not the value of the flag ON is changed from zero to one. When the negative determination is made, the routine immediately proceeds to step 1495 so that the present routine can be terminated.

Since the present time is immediately after the value of the flag ON is changed from zero to one because of the process in step 950, the positive determination is made in step 1404. The routine then proceeds to step 1406 in which a reference value of the value X in FIG. 7, i.e., reference value Xb, is selected on the basis of the required discharge volume qre at that point, and a reference value of the value Y in FIG. 7, i.e., reference value Yb, is selected on the basis of the master cylinder pressure estimated value Pm at that point.

Next, the routine proceeds to step 1408 in which it is determined whether or not a state where the actual OFF time Toffc specified in the above step 1315 is shorter than the time T1 specified in the above step 1220 continuously occurs N1 time(s) (fixed). A case where the positive determination is made will be explained later in detail.

When the negative determination is made in step 1408, the routine immediately proceeds to step 1414 in which it is determined whether or not a value of the flag F1 (which has been specified to be zero as an initial value in step 835) is equal to one. A case where the positive determination is made will be explained later in detail.

When the negative determination is made in step 1414, the process proceeds to step 1424 in which a state where the actual OFF time Toffc is equal to or longer than the time T1, and at the same time is shorter than the time T2 specified in the above step 1225 continues for a time T4. The time T4 is specified to be twice a control cycle time of the ABS control such as 500 msec, for example. A case where the positive determination is made will be explained later in detail.

When the negative determination is made in step 1424, the routine immediately proceeds to step 1430 in which it is determined whether or not a value of the flag F2 (which has been specified to be zero as an initial value in step 835) is equal to one. A case where the positive determination is made will be explained later in detail.

When the negative determination is made in step 1430, the routine immediately proceeds to step 1440 in which the value X is specified to be a value obtained by adding the X reduction amount DX to the value Xb selected in step 1406, and the value Y is specified to be a value obtained by adding the Y reduction amount DY to the value Yb selected in step 1406. The X reduction amount DX and the Y reduction amount DY are specified to be zero as an initial value in step 840. Thus, when it is assumed that the X reduction amount DX and the Y reduction amount DY are not changed and are retained to be zero, the value X is specified to be equal to the value Xb and the value Y is specified to be equal to the value Yb.

Next, the routine proceeds to step 1442 in which the voltage threshold value Von, the ON time Ton (for the minimum guaranteed discharge volume), and the nominal ON time Tonnom (for the nominal discharge volume) are selected based on the table Map (X, Y) as illustrated in FIG. 7 and the values X and Y specified in the above.

The routine then proceeds to step 1444 in which the ON time Ton is changed to a value obtained by subtracting the ON time reduction value DTon from the time selected in step 1442. The ON time reduction value DTon is specified to be zero as an initial value in step 825. Accordingly, when it is assumed that the ON time reduction value DTon is not changed from zero as the initial value, the ON time Ton is kept unchanged from the value selected in step 1442.

The routine proceeds to step 1446 in which it is determined whether or not the ON time Ton changed in step 1444 is shorter than the nominal ON time Tonnom. When the negative determination is made, the routine immediately proceeds to step 1495. On the other hand, when the positive determination is made, the routine proceeds to step 1448 in which the ON time Ton is specified to be equal to the nominal ON time Tonnom. That is, a lower limit of the ON time Ton is defined to be the nominal ON time Tonnom. This process is effective when the ON time reduction value DTon is not zero, which will be explained later.

Accordingly, because the routine in FIG. 14 is repeatedly performed, the motor drive pattern is determined or updated each time the motor MT is switched to the ON state. The motor drive pattern updated in the aforementioned manner is used for the determination in step 915 and step 945 in FIG. 9.

In the cases where the ON time reduction value DTon, the X reduction amount DX, and the Y reduction amount DY are all specified to be zero, the motor drive pattern is specified to be equal to a pattern determined in step 1406 (i.e., motor base drive pattern).

Figure 15:
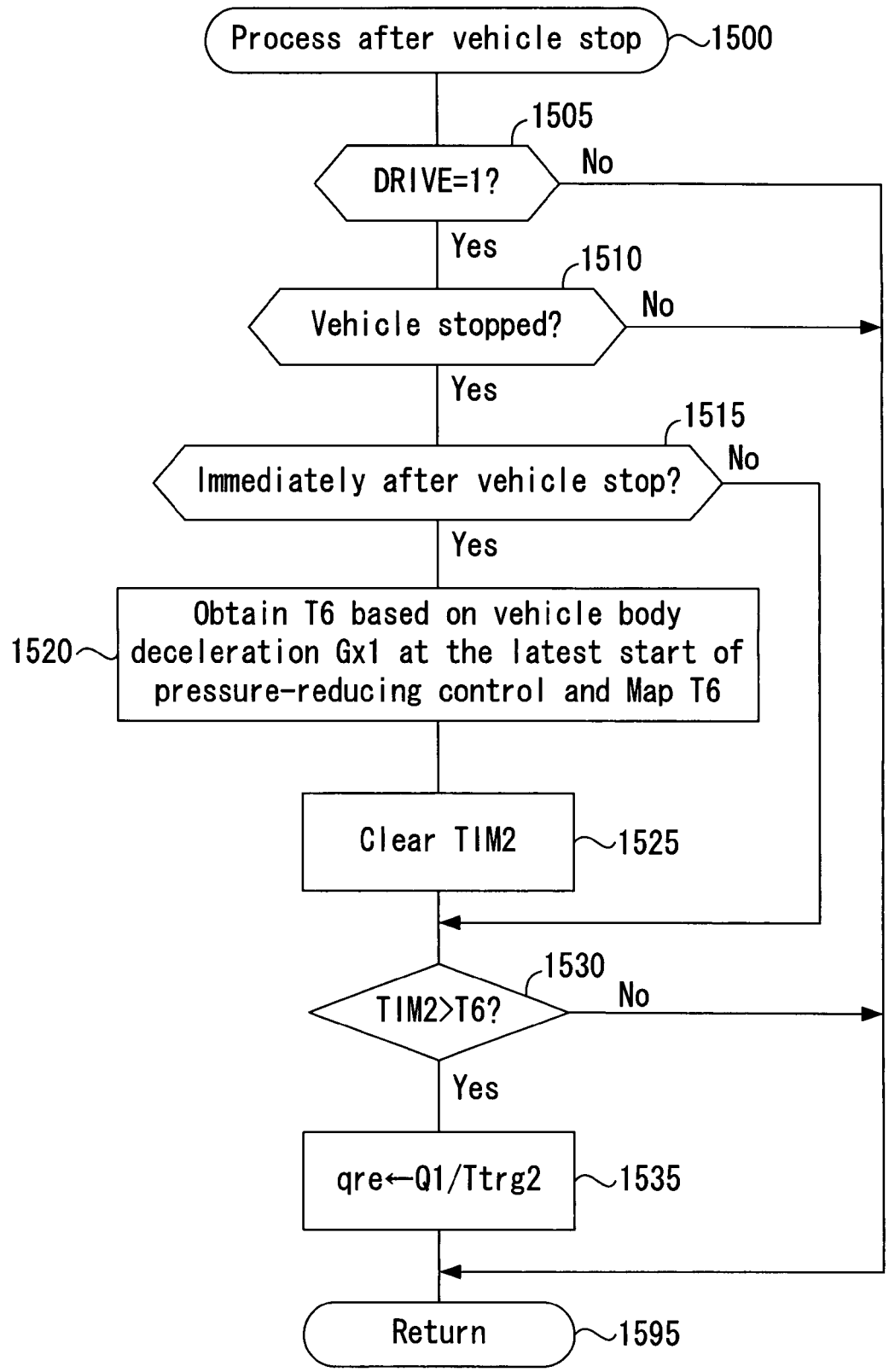
FIG. 15 is a flowchart illustrating a routine for performing a process after a vehicle stop performed by the CPU according to the first embodiment of the present invention.

Furthermore, the CPU 51 repeatedly performs a routine for conducting a process after a vehicle stop as illustrated in FIG. 15 at a predetermined time interval. At a predetermined timing, the CPU 51 (vehicle stop detecting means) starts the routine from step 1500. The routine then proceeds to step 1505 in which it is determined whether or not the value of the flag DRIVE is equal to one. When the negative determination is made, the routine proceeds to step 1595 so that the present routine can be terminated.

In the cases where the motor control is presently performed, the positive determination is made in step 1505 and the routine proceeds to step 1510 in which it is determined whether or not a vehicle is presently stopped (i.e., vehicle stop detecting means). This determination is achieved by a determination of whether or not a vehicle speed Vso obtained from an output signal of the vehicle speed sensor 41** through a known method is equal to zero.

When the negative determination is made in step 1510, the routine immediately proceeds to step 1595 so that the present routine can be terminated. A case where the positive determination is made will be explained later.

The case where the motor drive pattern is determined to be equal to the pattern determined in step 1406 (i.e., motor base drive pattern) is explained in the above. Next, a case where the motor drive pattern is specified to be different from the motor base drive pattern will be explained.

First, the case where it is determined that the reservoir is empty according to the reservoir empty determination (i.e., positive determination is made in step 1320 in FIG. 13) will be explained. That is, the reservoir fluid actual value Qact has already reached zero (see a time t5 or t11) prior to the start point of the OFF time Toff (see a time t6 or t12) that continues up to that point such as a time t7, t13, or the like, and thus the reservoir fluid actual value Qact is retained to be zero over the OFF time Toff.

In this case, the routine proceeds from step 1320 to step 1325 in which the reservoir fluid estimated value Q is reset to zero. Then, in step 1330, the required discharge volume qre is reset to zero. A resulting advantage will be explained below.

The reservoir fluid estimated value Q at the time the reservoir is determined to be empty can match the actual value Qact (=0). Accordingly, from this point, the reservoir fluid estimated value Q can be precise and accurate.

Figure 16:
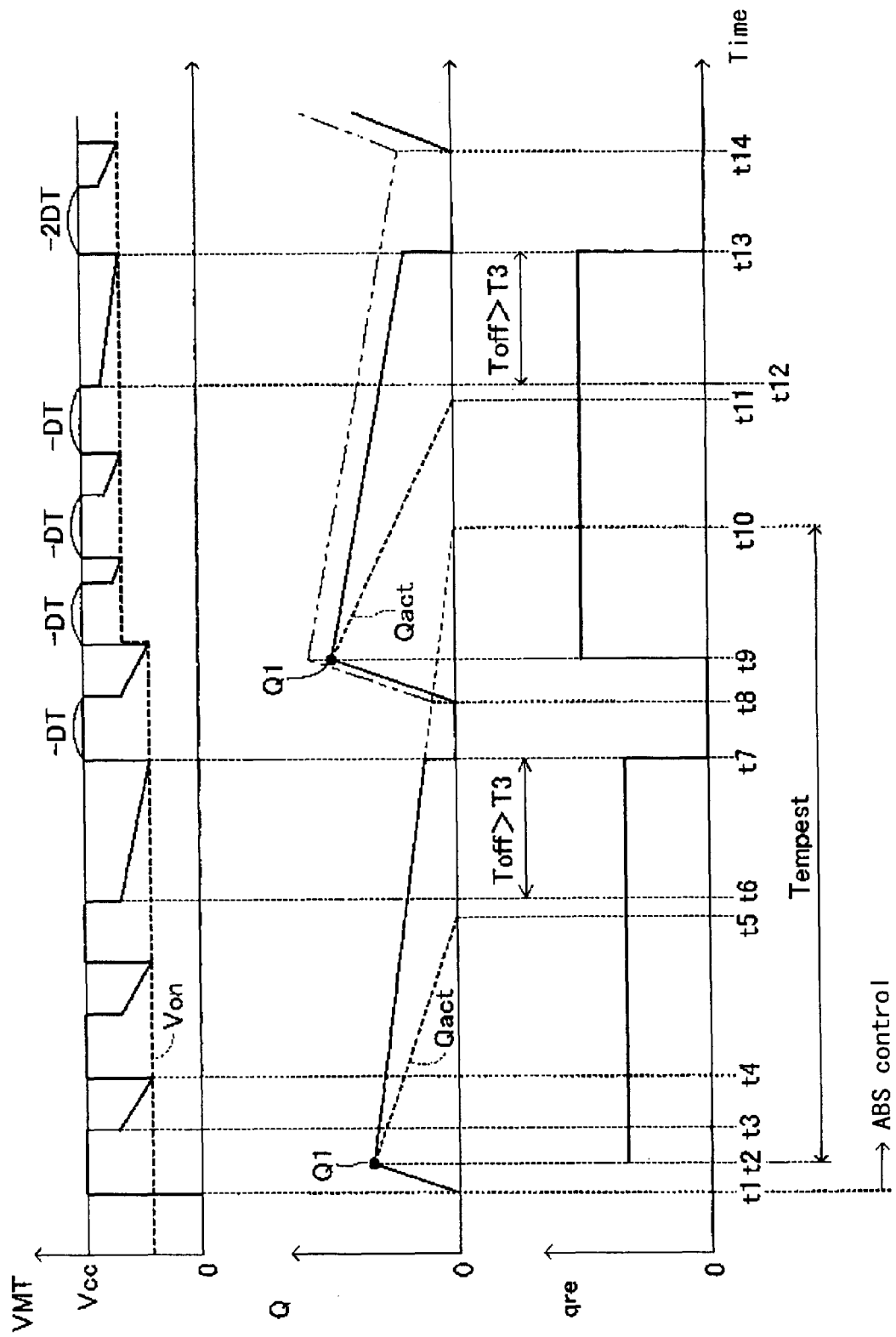
FIG. 16 is a time chart explaining an operation when an ON time is changed and the reservoir fluid estimated value is reset to zero according to the first embodiment of the present invention.

In addition, if the reservoir fluid estimated value Q is not reset to zero in the cases where the reservoir fluid estimated value Q is larger than zero at the time the reservoir is determined to be zero such as the time t7, t13, or the like in FIG. 16, for example, the reservoir fluid estimated value Q, which is calculated to be larger than the reservoir fluid actual value Qact, tends to be gradually separated from the actual value Qact as illustrated in a dotted line or a chain double-dashed line in FIG. 16. Accordingly, the required discharge volume qre is calculated to be significantly large (in step 1120) because the reservoir fluid estimated value Q is calculated to be significantly large, which may result in the large value Xb specified in step 1406. As a result, the rotational speed of the motor MT may be controlled to be excessively high.

In light of the foregoing, according to the present embodiment, the reservoir fluid estimated value Q is reset to zero each time the reservoir is determined to be empty to thereby avoid the aforementioned drawbacks.

As illustrated in FIG. 13, the CPU 51 determines whether or not the duration time TIM1 is shorter than the empty estimated time Tempest in step 1335. When the negative determination is made, the routine immediately proceeds to step 1395. On the other hand, when the positive determination is made, the routine proceeds to step 1340 in which the ON time reduction value DTon is updated to a value obtained by adding a value DT (5 msec, for example) to the value at that time (of which the initial value is zero). These steps 1335 and 1340 correspond to the changing means. A resulting advantage will be explained below.

As illustrated in FIG. 16, a state where a time period from the end of the pressure-reducing control (see the time t2) to a point when the reservoir is determined to be zero (see the time t7) is shorter than the empty estimated time Tempest (between t2 and t10) indicates that the actual drive discharge volume is greater than the discharge volume qpump1 (that is equal to the minimum guaranteed discharge volume, see steps 1025 and 1125). That is, the actual drive discharge volume is larger than the drive discharge volume estimated at the time the table in FIG. 7 is created. Accordingly, in this case, it may be possible that the actual discharge volume of the hydraulic pumps HPf and HPr is excessive.

In such a case (i.e., positive determination is made in step 1335), the ON time reduction value DTon, of which the initial value is zero, is made larger by the value DT. Accordingly, from this point, in step 1444 in FIG. 14, the ON time Ton is specified to be shorter by the value DT from the time determined according to the table in FIG. 7. In an example illustrated in FIG. 16, the positive determination is made in step 1335 at the time t7, which results in the ON time Ton to be specified shorter by the value DT between the time t7 and the time t12. The above step 1444 corresponds to the changing means.

Accordingly, the motor drive pattern is defined so that its rotational speed is lower than that of the motor base drive pattern. The rotational speed of the motor MT is controlled to be lower to thereby prevent the actual discharge volume of the hydraulic pumps HPf and HPr from being excessive.

The aforementioned process is performed each time the positive determination is made in step 1335. That is, in the example illustrated in FIG. 16, the positive determination is made in step 1335 at a time t13 as well. Then, the ON time Ton is specified to be shorter by a value (2·DT) from the time t13 to thereby prevent the actual discharge amount of the hydraulic pumps HPf and HPr from being excessive. That is, the rotational speed of the motor MT can gradually approach an appropriate value. Because of each process in steps 1446 and 1448, the ON time Ton is prevented from being specified to be shorter than the nominal ON time Tonnom. These steps 1446 and 1448 correspond to the changing means.

As mentioned above, since the table in FIG. 7 is created by considering that the drive discharge volume is equal to the minimum guaranteed discharge volume, the actual drive discharge volume can be made larger than the drive discharge volume estimated at the time the table is created. Thus, the actual discharge volume of the hydraulic pumps HPf and HPr are prevented from being insufficient. In addition, the ON time reduction value DTon is made larger by the value DT each time the positive determination is made in step 1335 to thereby gradually bring the rotational speed of the motor MT close to an appropriate value.

Next, the case where a state of "actual OFF time Toffc<Time T1" occurs continuously N1 times (i.e., positive determination is made in step 1408) will be explained. In this case, the routine proceeds to step 1410 in which the Y reduction amount DY is updated by adding a value Y1 to the value obtained at that time (of which the initial value is zero). The value Y1 is equal to a function of a value obtained by adding the value DY at that time to the reference value Yb of the value Y selected in step 1406. That is, the value Y1 is the function of the value "Yb+DY". It is defined that "Y1=2", "Y1=1", and "Y1=0", when "Yb+DY=1", "Yb+DY=2 or 3", and "Yb+DY=4", respectively. The routine then proceeds to step 1412 in which the value of the flag F1 is changed from zero to one. That is, "flag F1=1" indicates that the Y reduction amount DY is greater than zero. A resulting advantage will be explained below.

As mentioned above, the time T1 is obtained by multiplying the OFF estimated time Toffest by the coefficient α1 (for example, 0.5). That is, the time T1 is shorter than the OFF estimated time Toffest. Thus, the state where the actual OFF time Toffc is shorter than the time T1 indicates that the OFF estimated time Toffest is calculated to be longer. The OFF estimated time Toffest is calculated to be longer when the master cylinder pressure estimated value Pm is smaller.

Accordingly, the state where the actual OFF time Toffc is shorter than the time T1 indicates that the master cylinder pressure estimated value Pm is calculated to be smaller than the actual value. Thus, the motor base drive pattern in which the average power supply to the motor MT is small (i.e., lower boxes in FIG. 7) is selected. As a result, the rotational speed of the motor MT can be smaller than an appropriate value, which may cause insufficiency of the actual discharge volume of the hydraulic pumps HPf and HPr.

When the aforementioned state continues (i.e., positive determination is made in step 1408), the Y reduction DY, of which the initial value is zero, is made larger by the value Y1 as mentioned above. Thus, from this point, the value Y is specified to be larger by the Y reduction amount DY (=Y1) from the value Yb. That is, the motor drive pattern in which the average power supply to the motor MT is larger (i.e., upper boxes in FIG. 7) than that of the motor base drive pattern is selected in step 1442.

Accordingly, the motor drive pattern is specified so that the rotational speed is larger than that of the motor base drive pattern. Since the rotational speed of the motor MT is controlled to be high, a degree of insufficiency of the actual discharge volume of the hydraulic pumps HPf and HPr can be reduced.

The Y reduction amount DY is specified to be larger each time the positive determination is made in step 1408. The rotational speed of the motor MT (and thus the actual discharge volume of the hydraulic pumps HPf and HPr) can gradually approach an appropriate value.

When the flag F1 is equal to one (i.e., DY>0 and the motor drive pattern is specified so that the rotational speed is higher than that of the motor base drive pattern), the positive determination is made in step 1414. The routine proceeds to step 1416 in which it is determined whether or not "T1<Toffc" occurs continuously N2 times (fixed).

The OFF time Toff tends to be longer when the rotational speed of the motor MT is higher. That is, the state in which the actual OFF time Toffc is equal to or longer than the time T1 indicates that the rotational speed of the motor MT is sufficiently high.

Each time the positive determination is made in step 1416, the routine proceeds to step 1418 in which the Y reduction amount DY (>0) is made smaller by "1 (one)". Then, in step 1420, it is determined whether or not the Y reduction amount DY reaches zero. When the positive determination is made, the flag F1 is changed from one to zero in step 1422. Form then on, since the flag F1 is equal to zero, the negative determination is made in step 1414.

Accordingly, each time the positive determination is made in step 1416, the motor drive pattern gradually returns to the motor base drive pattern.

Next, a case where a state of "Time T1≦actual OFF time Toffc<Time T2" continues for a time T4 (fixed) (i.e., positive determination is made in step 1424 in FIG. 14) will be explained. In this case, the routine proceeds to step 1426 in which the X reduction amount DX is updated by adding a value X1 to the value obtained at that time (of which the initial value is zero). The value X1 is equal to a function of a value obtained by adding the value DX at that time to the reference value Xb of the value X selected in step 1406. That is, the value X1 is the function of the value "Xb+DX". It is defined that "X1=1" and "X1=0" when "Xb+DX=1 or 2", and "Xb+DX=3", respectively. The routine then proceeds to step 1428 in which the value of the flag F2 is changed from zero to one. That is, "flag F2=1" indicates that the X reduction amount DX is larger than zero. A resulting advantage will be explained below.

As mentioned above, the time T2 is obtained by multiplying the OFF estimated time Toffest by the coefficient α2 (1.1, for example). That is, the time T2 is close to the OFF estimated time Toffest and sufficiently shorter than the reservoir empty OFF time Toffemp. Thus, the state where the actual OFF time Toffc is kept shorter than the time T2 indicates that the reservoir fluid actual value Qact is prevented from being zero.

Meanwhile, when the reservoir fluid estimated value Q is kept calculated to be smaller than the actual value Qact, the motor base drive pattern in which the average power supply to the motor MT is smaller (i.e., left side boxes in FIG. 7) is selected. The rotational speed of the motor MT may continue to be smaller than an appropriate value. As a result, the actual discharge volume of the hydraulic pumps HPf and HPr is made insufficient and thus the reservoir fluid actual value Qact may continue to be prevented from being zero.

Accordingly, when the actual OFF time Toffc is kept shorter than the time T2, the reservoir fluid estimated value Q is kept calculated to be smaller than the actual value Qact.

In the cases where the positive determination is made in step 1424, as mentioned above, the X reduction amount (of which the initial value is zero) is made larger by the value X1. Thus, from this point, in step 1440 in FIG. 14, the value X is specified to be larger by the X reduction amount DX (=X1) from the value Xb. That is, in step 1442, the motor drive pattern is specified so that the average power supply to the motor MT is larger than that of the motor base drive pattern (i.e., right side boxes in FIG. 7). These steps 1440 and 1442 correspond to the changing means.

Accordingly, the motor drive pattern in which the rotational speed of the motor MT is higher than that of the motor base drive pattern is determined to thereby avoid a continuation of the state where the reservoir fluid actual value Qact is prevented from being zero.

The X reduction amount DX can be specified to be larger each time the positive determination is made in step 1424. Thus, the rotational speed of the motor MT (and thus the actual discharge volume of the hydraulic pumps HPf and HPr) can gradually approach an appropriate value.

Meanwhile, when the flag F2 is equal to one (i.e., DX>0 and the motor drive pattern in which the rotational speed of the motor MT is larger than that of the motor base drive pattern is selected), the positive determination is made in step 1430. The routine then proceeds to step 1432 in which it is determined whether or not a state of "T2≦Toffc" occurs N3 times (fixed) during a time T5 (fixed).

The OFF time Toff tends to be longer while the rotational speed of the motor MT is higher. That is, when the actual OFF time Toffc is equal to or longer than the time T2, the rotational speed of the motor MT is sufficiently high.

Each time the positive determination is made in step 1432, the routine proceeds to step 1434 in which the X reduction amount DX (>0) is made smaller by "1 (one)". Then, in step 1436, it is determined whether or not the X reduction amount DX reaches zero. When the positive determination is made, the flag F2 is changed from one to zero in step 1438. From this point, since the flag F2 is equal to zero, the negative determination is made in step 1430.

According to the aforementioned process, each time the positive determination is made in step 1432, the motor drive pattern gradually returns to the motor base drive pattern.

Next, the process after a vehicle stop (i.e., positive determination is made in step 1510 in FIG. 15) will be explained with reference to FIG. 17. FIG. 17 is a time chart illustrating an example of a case where the ABS control starts at the time t1 and continues (and thus the motor control starts and continues), and a vehicle stops at the time t2.

In the cases where a running vehicle stops (see the time t2 in FIG. 17), the positive determination is made in step 1510. Then, the routine proceeds to step 1515 in which it is determined whether or not the present time is immediately after the vehicle stop. The positive determination is made in step 1515 and the routine proceeds to step 1520 in which a time T6 is obtained on the basis of a vehicle deceleration Gx1 at the latest start of the pressure-reducing control, and a table MapT6 of which an argument is Gx1. The time T6 is specified to be longer when the vehicle deceleration Gx1 is larger.

The routine then proceeds to step 1525 in which a duration time TIM2 is cleared. The duration time TIM2 is measured by a timer (not shown) incorporated in the electronic control unit 50 and indicates an elapsed time from the vehicle stop.

Figure 17:
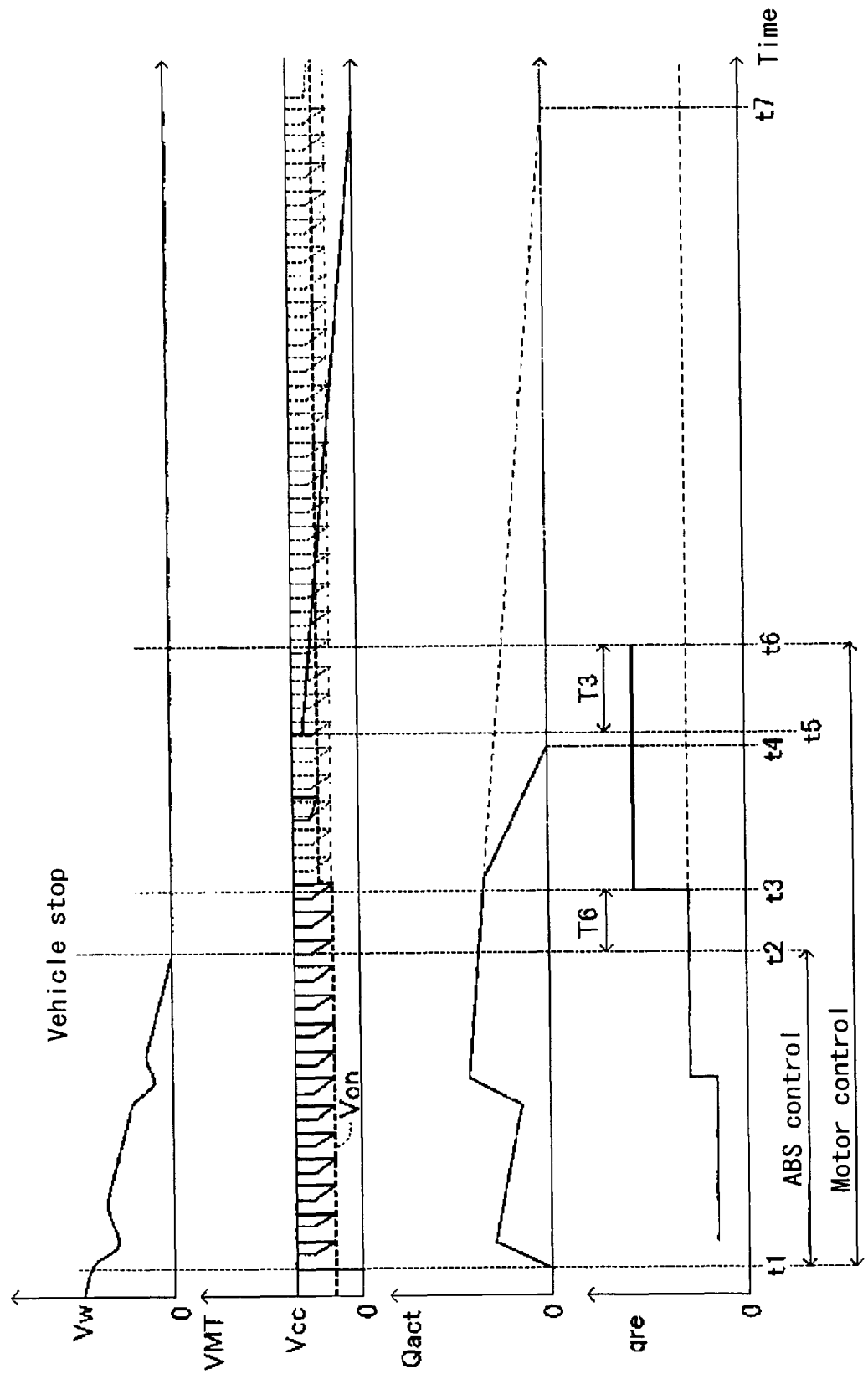
FIG. 17 is a time chart explaining an operation when the motor drive pattern is changed after the vehicle stop according to the first embodiment of the present invention.

The routine proceeds to step 1530 in which it is determined whether or not the duration time TIM2 exceeds the time T6 (i.e., time t3 is achieved in FIG. 17). Since the present time is immediately after the vehicle stop, the negative determination is made and then the routine immediately proceeds to step 1595 so that the present routine can be terminated. From then on, processes in steps 1505, 1510, 1515, and 1530 are repeated until the duration time TIM2 exceeds the time T6 during the motor control (DRIVE=1).

When the duration time TIM2 exceeds the time T6 during the motor control (see the time t3 in FIG. 17), the positive determination is made in step 1530 and the routine proceeds to step 1535 in which the required discharge volume qre is changed to a value obtained by dividing the latest value Q1 calculated in step 1115 by a target time Ttrg2 (<target time Ttrg1). Since the ABS control is finished after the vehicle stop, the value Q1 is retained to be a latest value before the vehicle stop. Thus, because of the process in step 1535, the required discharge volume qre increases in a step manner from a value (Q1/Ttrg1) to a value (Q1/Ttrg2). A resulting advantage will be explained below.

If the motor control end condition (i.e., step 855 in FIG. 8) is not satisfied even when the time t6 has elapsed after the vehicle stop, the OFF time Toff is prevented from being made longer than the time T3 for a relatively long time after the vehicle stop. That is, the reservoir fluid actual value Qact is kept prevented from being zero for a relatively long time, as illustrated by a dotted line in FIG. 17.

In such a case, by the increase of the required discharge volume qre, the motor drive pattern in which the rotational speed of the motor MT is higher can be determined at the time of the initial ON of the motor MT after the required discharge volume qre increases (i.e., the time t3 in FIG. 17). The rotational speed of the motor MT can be higher to thereby speed up timing when the reservoir fluid actual value Qact becomes zero (i.e., the time t4 in FIG. 14).

Accordingly, the motor control end condition is satisfied and the motor control is finished when the OFF time Toff that has started from the initial OFF of the motor MT (i.e., the time t5) from the time t4 reaches the time T3 (i.e., time t6). That is, the end point of the motor control can be accelerated.

As explained above, according to the apparatus for controlling a pump driving motor of the first embodiment, the drive pattern of the motor MT (i.e., Von and Ton) is basically specified to be equal to the motor base drive pattern determined on the basis of the master cylinder pressure estimated value Pm, the required discharge volume qre (i.e., a value proportional to the reservoir fluid estimated value Q), and the table Map (X, Y) illustrated in FIG. 7 in the cases where DTon=DX=DY=0, i.e., X=Xb and Y=Yb. On the other hand, when at least one of DTon, DX and DY turns to a value other than zero, the drive pattern of the motor MT is specified to be different from the motor base drive pattern.

Accordingly, the rotational speed of the motor MT can approach an appropriate value to thereby avoid an issue raised by a low rotational speed of the motor MT such as that a stroke of a brake pedal is made larger, and the wheel cylinder pressure is prevented from being sufficiently reduced during the pressure-reducing control of the ABS control. In addition, an issue raised by a high rotational speed such as a large operating noise of the motor MT and the hydraulic pumps HPf and HPr can be avoided.

In the cases where it is not detected that the reservoir fluid actual value Qact turns to zero even when a predetermined time (T6) has elapsed after the vehicle stop, the motor drive pattern is changed so that the rotational speed of the motor MT becomes higher. Thus, after the vehicle stop, timing when the reservoir fluid actual value Qact turns to zero can be accelerated.

In addition, in the cases where it is detected that the reservoir fluid actual value Qact turns to zero, the reservoir fluid actual value Qact is reset to zero. Thus, an occurrence of an issue caused by the high rotational speed of the motor MT resulted from that the reservoir fluid estimated value Q (and thus the required discharge volume qre) is calculated to be larger can be avoided.

The first embodiment is not limited to the above and can be changed as follows. For example, according to the first embodiment, the ON time Ton is specified to be shorter (in steps 1340 and 1444) so as to decrease the rotational speed of the motor MT when it is detected (i.e., positive determination is made in step 1335) that the actual drive discharge volume at the time of the motor ON is larger than the drive discharge volume estimated (i.e., minimum guaranteed discharge volume) when the table in FIG. 7 is created. Alternatively, the voltage threshold value Von can be specified smaller so as to decrease the rotational speed of the motor MT.

In addition, according to the first embodiment, the state in which the master cylinder pressure estimated value Pm is calculated to be smaller is detected on the basis that the state of "Toffc<T1" continuously occurs N1 times (in step 1408). However, it can be detected on the basis that the state of "Toffc<T1" occurs only one time.

Further, according to the first embodiment, the state in which the reservoir fluid estimated value Q is calculated to be smaller is detected on the basis that the state of "T1≦Toffc<T2" continues for the time T4 (in step 1424). Alternatively, it can be detected on the basis that the state of "T1≦Toffc<T2" continuously occurs a predetermined time.

Furthermore, according to the first embodiment, the reservoir empty determination is made at the time of the motor ON (in step 1320). Alternatively, the reservoir empty determination can be made when the OFF duration time TIMoff reaches the time T3 (TIMoff>T3).

Furthermore, according to the first embodiment, the required discharge volume qre is changed from the value (Q1/Ttrg1) to the value (Q1/Ttrg2) so as to increase the required discharge volume qre after the vehicle stop (in step 1535). Alternatively, the required discharge volume qre can be made larger by changing the value (Q1/Ttrg1) in such a way by to be multiplied by a predetermined coefficient (larger than one).

Furthermore, according to the first embodiment, the motor drive pattern is changed each time the motor ON occurs. Alternatively, the motor drive pattern can be changed each time the required discharge volume qre is updated (i.e., pressure-reducing control is finished).

Furthermore, according to the first embodiment, in the cases where the reservoir fluid estimated value Q is calculated (see the aforementioned formula), the discharge volume qpump1 of the hydraulic pumps HPf and HPr is calculated on the assumption that the drive discharge volume is equal to the minimum guaranteed discharge volume (in steps 1025 and 1030). Alternatively, the discharge volume can be calculated on the assumption that the drive discharge volume is equal to the middle value (nominal volume).

In this case, when a state where the reservoir fluid actual value Qact turns to zero is not detected for a predetermined time, the reservoir fluid estimated value Q should be corrected to be larger.

Accordingly, in the cases where the discharge volume of the hydraulic pumps HPf and HPr used for calculating the reservoir fluid estimated value Q is calculated on the assumption that the drive discharge volume is equal to the nominal volume, a possible deterioration of the hydraulic pumps HPf and HPr may cause the reservoir fluid estimated value Q to be calculated smaller than the actual value Qact. That is, the reservoir fluid actual value Qact ie kept prevented from being zero for a relatively long time.

However, according to the first embodiment, when it is detected that the reservoir fluid estimated value Q is calculated smaller than the actual value Qact, the reservoir fluid estimated value Q is corrected to be larger (for example, to increase in a step manner) so that the reservoir fluid estimated value Q can approach the actual value Qact. In addition, the rotational speed of the motor MT is prevented from being calculated to be smaller than the appropriate value.

Figure 18:
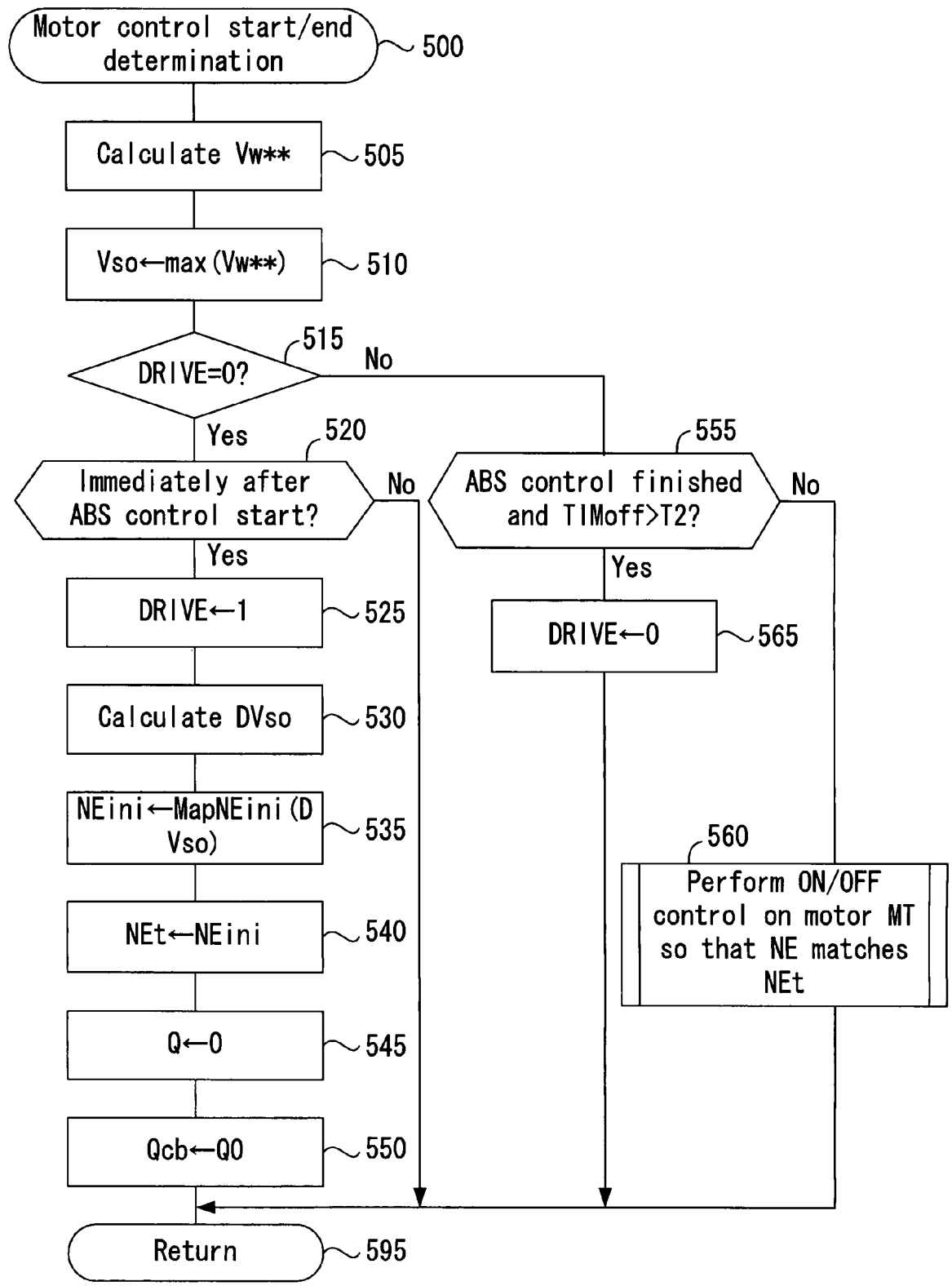
FIG. 18 is a flowchart illustrating a motor control start/end determination routine performed by the CPU provided in the brake apparatus according to a second embodiment of the present invention.
Figure 19:
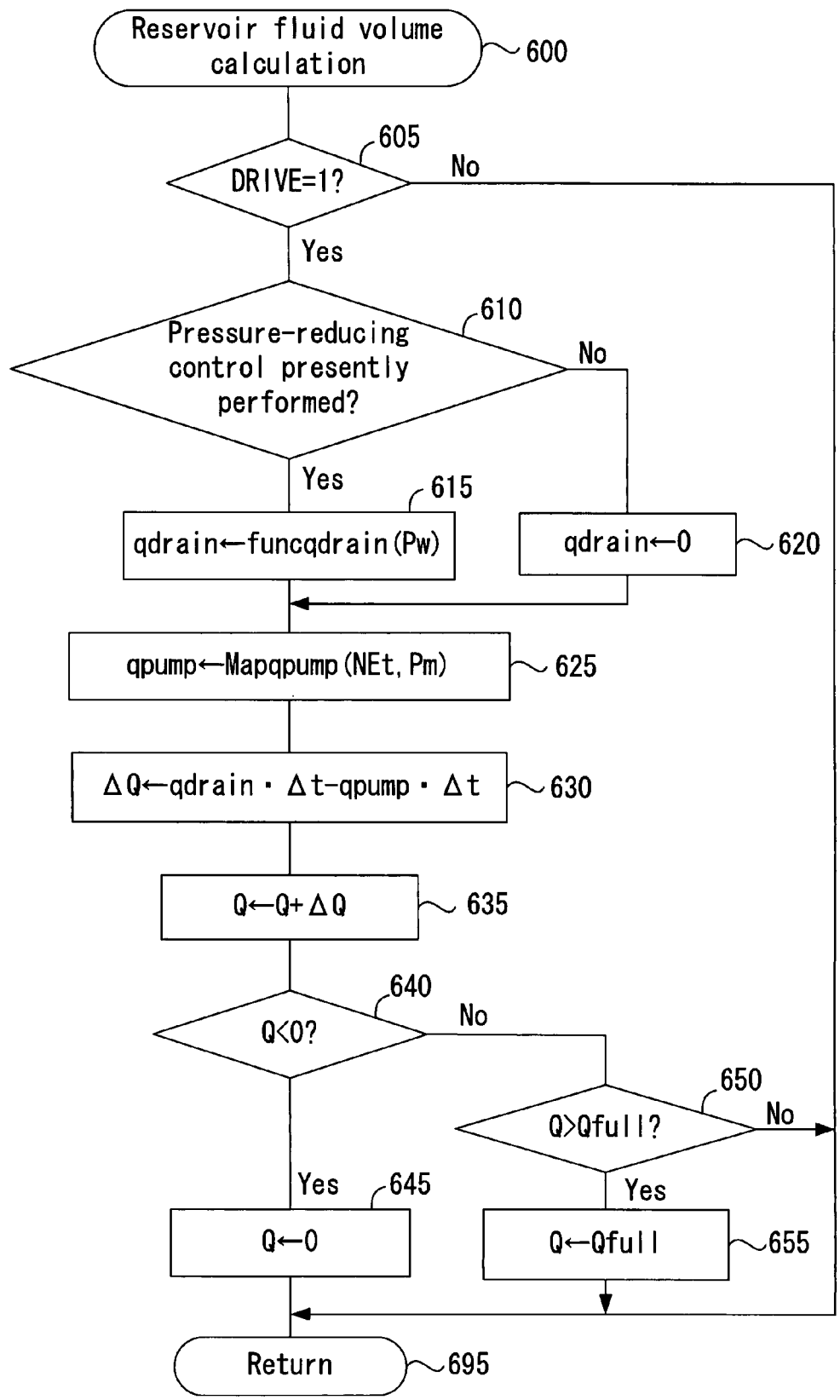
FIG. 19 is a flowchart illustrating a reservoir fluid volume calculation routine performed by the CPU according to a second embodiment of the present invention.
Figure 20:
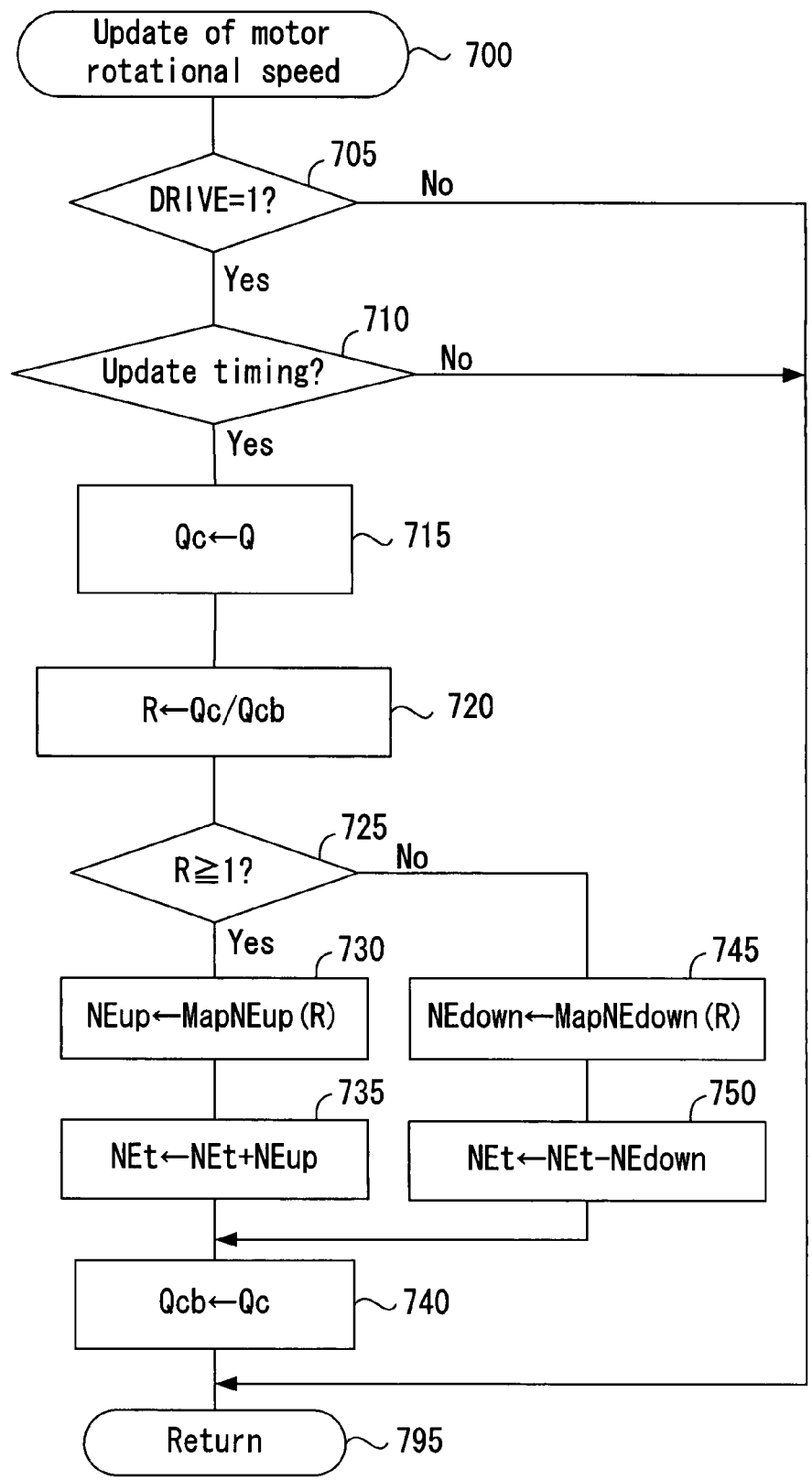
FIG. 20 is a flowchart illustrating a motor rotational speed update routine performed by the CPU according to a second embodiment of the present invention.
Figure 23:
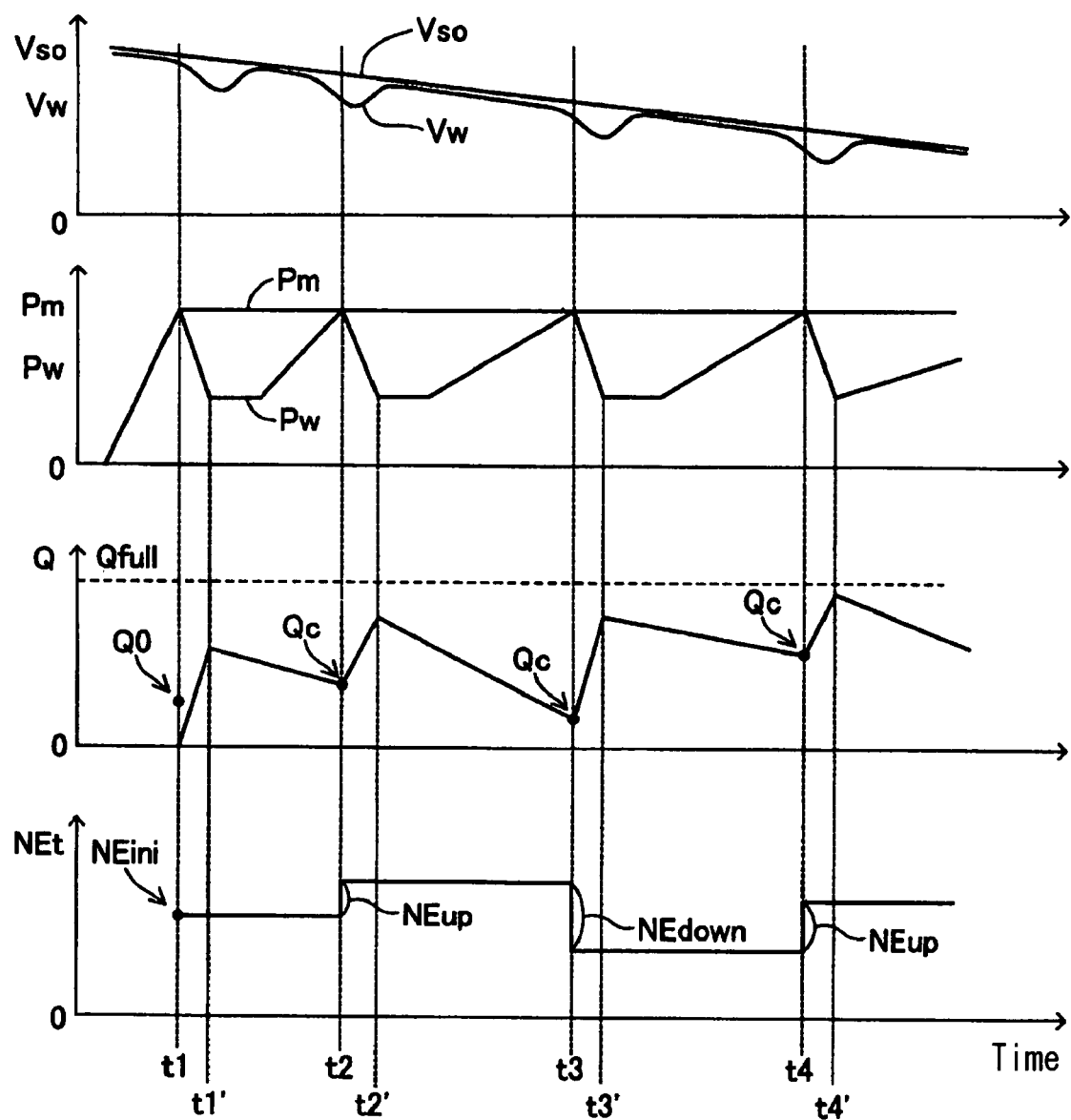
FIG. 23 is a time chart illustrating an example case in which a target rotational speed of the motor is updated in response to the change of the reservoir fluid estimated value according to a second embodiment of the present invention.

Next, a second embodiment of the present invention will be explained with reference to FIGS. 18 to 24. FIGS. 18 to 20 are flowcharts illustrating routines conducted by the CPU 51 of the electronic control unit 50. FIG. 23 illustrates a vehicle body speed Vso, a wheel speed Vw of a wheel on which the ABS control is conducted (i.e., ABS control execution wheel), a master cylinder pressure estimated value Pm, a wheel cylinder pressure Pw of the ABS control execution wheel, an estimated value Q of the brake fluid volume in a reservoir RSf or RSr (each of which may be hereinafter simply referred to as "reservoir") connected to the ABS control execution wheel (i.e., reservoir fluid volume), and an example of a variation of a target rotational speed NTt of the motor MT in the cases where the ABS control is started and conducted on only one wheel from a time t1.

The CPU 51 repeatedly performs a motor control start/end determination routine as illustrated in FIG. 18 at a predetermined time interval. At a predetermined timing, the CPU 51 starts the routine from step 500. The routine then proceeds to step 505 in which the wheel speed Vw (i.e., speed of an outer circumference of the wheel) is calculated on the basis of an output of a wheel speed sensor 41*. Next, the routine proceeds to step 510 in which the vehicle body speed Vso is set to a maximum value of the wheel speed Vw.

The routine proceeds to step 515 to determine whether or not a value of a flag DRIVE is equal to zero. In this case, the value "1 (one)" of the flag DRIVE indicates that the motor MT is presently controlled (i.e., motor control is being performed) while the value "0 (zero)" of the flag DRIVE indicates that the motor MT is not presently controlled (i.e., motor control is not being performed).

In the cases where the motor control is not presently performed and the motor control start condition is not satisfied, the value of the flag DRIVE is zero. Thus, the positive determination (i.e., "YES") is made in step 515 and then the routine proceeds to step 520 where it is determined whether or not the motor control start condition is satisfied. According to the present embodiment, the motor control start condition is satisfied when the ABS control is started.

At this time, since the motor control start condition is not satisfied as described in the above, the negative determination (i.e., "NO") is made in step 520 and the routine immediately proceeds to step 595 so that the present routine can be terminated. Such operation is repeated until the motor control start condition is satisfied (i.e., before the time t1 in FIG. 23).

In the cases where the ABS control is started from the aforementioned state (i.e., motor start condition is satisfied) (see the time t1 in FIG. 23), the positive determination is made in step 520 and then the routine proceeds to step 525 in which the value of the flag DRIVE is changed from zero to one.

Next, the routine proceeds to step 530 in which a vehicle deceleration DVso is calculated by conducting a time derivative on the vehicle body speed Vso and a sign of the resulting value is inverted. Accordingly, the vehicle body deceleration DVso is a value obtained at the start of the ABS control (i.e., time t1 in FIG. 23).

The routine then proceeds to step 535 in which an initial value NEini of the target rotational speed of the motor MT is obtained on the basis of the vehicle body deceleration speed DVso and a table Map NEini (not shown). The value NEini is specified to be large in response to the increase of the vehicle body deceleration speed DVso.

In addition, the value NEini is determined in response to the vehicle body deceleration at the start of the ABS control so that the reservoir fluid volume during the ABS control can vary in a range from zero to a maximum reservoir fluid volume Qfull (i.e., maximum brake fluid volume stored in the reservoir RSf or RSr).

The table MapNEini used for obtaining the value NEini can be created through an experimental test, a simulation, and the like by variously changing the vehicle body deceleration at the start of the ABS control for seeking an optimum rotational speed of the motor MT required for the reservoir fluid volume to vary in the range from zero to the maximum reservoir fluid volume Qfull.

The routine then proceeds to step 540 in which a target rotational speed NEt at this time (at the start of ABS control, i.e., time t1 in FIG. 23) is set to the value NEini. Accordingly, the target rotational speed NEt (=NEini) at the start of the ABS control is determined on the basis of the vehicle body deceleration DVso at the start of the ABS control. The routine proceeds to step 545 in which the estimated value Q of the reservoir fluid volume, which is calculated and updated in a routine to be explained later, is set to zero as an initial value at the start of the ABS control.

The routine proceeds to step 550 in which a previous value of a value Qc, i.e., value Qcb, is set to an initial value Q0. The value Qc (corresponding to the reservoir fluid estimated value Q at the time t2, t3, or t4 in FIG. 23) is equal to the reservoir fluid estimated value Q obtained each time the pressure-intensifying control is finished (i.e., predetermined timing). The routine then proceeds to step 595 so that the present routine can be terminated.

The value Qc is used to the update of the target rotational speed NEt of the motor MT (to be explained later). The initial value Q0 for the previous value Qcb of the value Qc is specified to be the reservoir fluid value at the end of the pressure-intensifying control in the cases where the vehicle body speed at the start of the ABS control is equal to the value DVso and the rotational speed NE of the motor MT is controlled to be the value NEini. The initial value Q0 can be also obtained through an experimental test, a simulation, and the like by variously changing the vehicle body deceleration (and the rotational speed of the motor MT) at the start of the ABS control.

Afterwards, since the value of the DRIVE is set to one, the negative determination is made in step 515. Next, in step 555, it is determined whether or not the motor control end condition is satisfied. According to the present embodiment, the motor control end condition is satisfied when the ABS control is finished and an OFF duration time TIMoff exceeds a predetermined time T2 (fixed).

At this moment, the motor control end condition is not satisfied as immediately after the start of the motor control. Thus, the negative determination is made in step 555 and the routine immediately proceeds to step 560 in which a voltage threshold value Von is specified or changed so that the (average) rotational speed NE of the motor MT matches the target rotational speed NEt (which is equal to the value NEinin according to the process in step 540). As a result, the motor drive pattern constituted by the voltage threshold value Von and an ON time Ton (fixed) is repeated for the purposes of performing the ON\OFF control on the power supply to the motor MT. Then, the routine immediately proceeds to step 595 so that the present routine can be terminated. Such operation is repeated until the motor control end condition is satisfied.

Accordingly, the rotational speed NE of the motor MT is controlled so as to match the target rotational speed NEt (which is appropriately updated and changed by a routine to be mentioned later). Thus, the rotational speed and discharge volume of the hydraulic pumps HPf and HPr are controlled. As a result, the reservoir fluid volume during the ABS control can be adjusted to vary within a range from zero to the maximum reservoir fluid volume Qfull.

On the other hand, in the cases where the motor control end condition is satisfied from the aforementioned state, the positive determination is made in step 555 and the routine proceeds to step 565 in which the value of the flag DRIVE is changed from one to zero.

Afterwards, since the value of the DRIVE is set to zero, the positive determination is made in step 515. Next, in step 520, it is monitored again whether or not the motor control start condition is satisfied.

Accordingly, because the routine in FIG. 18 is repeatedly performed, the value of the flag DRIVE is retained at one while the motor control is being performed and is retained at zero while the motor control is not being performed. While the value of the flag DRIVE is retained at one, the rotational speed NE of the motor MT is controlled to match the target rotational speed NEt that can be appropriately updated and changed.

The CPU 51 repeatedly performs a reservoir fluid volume calculation routine as illustrated in FIG. 19 at a predetermined time interval by following the routine in FIG. 18. At a predetermined timing, the CPU 51 starts the routine from step 600. The routine then proceeds to step 605 to determine whether or not the value of the flag DRIVE is equal to one. When it is determined that the value is not equal to one, the routine proceeds to step 695 so that the present routine can be terminated.

In the cases where the motor control is presently performed (i.e., after the time t1 in FIG. 23), the flag DRIVE is set to one in step 515 as mentioned above. Thus, the positive determination is made in step 605 and the routine proceeds to step 610 in which it is determined whether or not the pressure-reducing control is presently performed.

In the cases where the pressure-reducing control is presently performed (see a time period from t1 to t1', t2 to t2', t3 to t3', or t4 to t4' in FIG. 23), the positive determination is made in step 610 and the routine proceeds to step 615 to obtain a discharge volume qdrain based on the wheel cylinder pressure estimated value Pw that can be obtained by a known method and a function funcqdrain of which an argument is Pw. The discharge volume qdrain is the volume of brake fluid discharged from the pressure-reducing valve PD and flows into the reservoir during the pressure-reducing control (i.e., pressure-reducing valve PD is in the open state). The discharge volume qdrain can be calculated on the basis of the wheel cylinder pressure and an open area (which is fixed) of the pressure-reducing valve PD in the open state and therefore can be obtained from the function of the wheel cylinder pressure Pw. When the pressure-reducing control is performed simultaneously on two or more of the wheels, the discharge volume qdrain is a sum of the discharge volume for those wheels.

Meanwhile, in the cases where the pressure-reducing control is not presently performed (i.e., hold control or linear pressure-intensifying control is presently performed) (see a time period from t1' to t2, T2' to t3, or t3' to t4 in FIG. 23), the negative determination is made in step 610 and the routine proceeds to step 620 in which the discharge volume qdrain is defined to be zero. This is based on a fact that the pressure-reducing valve PD** is retained in the closed state during the hold control or the linear pressure-intensifying control.

Next, the routine proceeds to step 625 to obtain a discharge volume qpump of the hydraulic pumps HPf and HPr based on the target rotational speed NEt at that point, the master cylinder pressure estimated value Pm, and a table Mapqpump of which arguments are NEt and Pm. The discharge volume qpump depends on the rotational speed of the hydraulic pumps HPf and HPr, and the master cylinder pressure. The discharge volume qpump is large when the rotational speed is high while is small when the master cylinder pressure is large. Accordingly, the discharge volume qpump can be obtained on the basis of the target rotational speed NEt and the master cylinder pressure estimated value Pm.

The routine proceeds to step 630 in which a variation ΔQ of the reservoir fluid estimated value Q per program execution period Δt is obtained based on a formula below. In this case, "qdrain·Δt" corresponds to the brake fluid volume flowing into the reservoir per program execution period Δt while "qpump·Δt" corresponds to the brake fluid volume sucked by the hydraulic pumps HPf and HPr from the reservoir.

Formula: $\Delta Q = q\text{drain} \cdot \Delta t - q\text{pump} \cdot \Delta t$ The routine then proceeds to step 635 in which the reservoir fluid estimated value Q is updated by adding the variation ΔQ obtained in step 630 to the present reservoir fluid estimated value (which is set to the initial value, i.e., zero, in step 545 as immediately after the start of the ABS control, i.e., the motor control).

Next, the routine proceeds to step 640 in which it is determined whether or not the updated reservoir fluid estimated value Q is a negative value. When the positive determination is made, the routine proceeds to step 645 in which the reservoir fluid estimated value Q is set to zero, again. On the other hand, when the negative determination is made in step 640, the routine proceeds to step 650 in which it is determined whether or not the reservoir fluid estimated value Q is greater than the maximum reservoir fluid volume Qfull. When the positive determination is made, the reservoir fluid estimated value Q is reset to the maximum reservoir fluid volume Qfull. Accordingly, the reservoir fluid estimated value Q is defined between zero and the value Qfull. The routine then proceeds to step 695 so that the present routine can be terminated.

In the cases where the negative determination is made in step 650 (i.e., 0<Q<Qfull), the routine immediately proceeds to step 659 without resetting the reservoir fluid estimated value Q.

Accordingly, because the routine in FIG. 19 is repeatedly performed, the reservoir fluid estimated value Q (0<Q<Qfull) can be updated per program execution period Δt based on the brake fluid volume discharged from the pressure-reducing valve PD** and the brake fluid volume sucked by the hydraulic pumps HPf and HPr. Therefore, as illustrated in FIG. 23, the reservoir fluid estimated value Q increases during the pressure-reducing control (i.e., a time period from t1 to t1', t2 to t2', or the like) on the basis of a relation of qdrain>qpump. On the other hand, the reservoir fluid estimated value Q decreases during the hold control or the linear pressure-intensifying control (i.e., a time period from t1' to t2, t2' to t3, or the like) as qdrain is retained to be zero. The method for obtaining the reservoir fluid estimated value Q corresponds to an estimated fluid volume obtaining means.

The CPU 51 repeatedly performs a motor rotational speed update routine as illustrated in FIG. 20 at a predetermined time interval by following the routine in FIG. 19. At a predetermined timing, the CPU 51 starts the routine from step 700. The routine then proceeds to step 705 to determine whether or not the value of the flag DRIVE is equal to one. When it is determined that the value is not equal to one, the routine proceeds to step 795 so that the present routine can be terminated.

In the cases where the motor control is presently performed (i.e., after the time t1 in FIG. 23), the flag DRIVE is equal to one in step 525 as mentioned above. Thus, the positive determination is made in step 705 and the routine proceeds to step 710 in which it is determined whether or not an update timing of the target rotational speed NEt of the motor MT arrives on the basis of a slip ratio of the wheel. According to the present embodiment, the update timing is specified to be the linear pressure-intensifying control end point, i.e., next pressure-reducing control period start point (corresponding to the time t2, t3, or t4 in FIG. 23). When the negative determination is made, the routine immediately proceeds to step 795.

In the cases where the update timing of the target rotational speed NEt arrives, the positive determination is made in step 710 and the routine proceeds to step 715 in which the value Qc is set to the reservoir fluid estimated value Q at that point. That is, as mentioned above, the value Qc is equal to the reservoir fluid estimated value Q obtained each time the pressure-intensifying control end point arrives (see the time t2, t3, or t4 in FIG. 23).

Next, the routine proceeds to step 720 in which a value R is set to a value Qc/Qcb. As mentioned above, the value Qcb is the previous value of the value Qc (i.e., value Qc obtained at the previous update timing). The initial value of the value Qcb is set to the value Q0 in step 550. From then on, the value Qcb is updated to be the value Qc at that time, each time the update timing arrives. Thus, the present value R indicates an increase or decrease of the reservoir fluid estimated value Q between the previous update timing to the present update timing.

The routine then proceeds to step 725 in which it is determined whether or not the value R is equal to or greater than one (i.e., reservoir fluid estimated value Q is increasing). A case where the positive determination is made in step 725 (i.e., reservoir fluid estimated value Q is increasing), which corresponds to the time t2 or t4 in FIG. 23, will be explained below.

Figure 21:
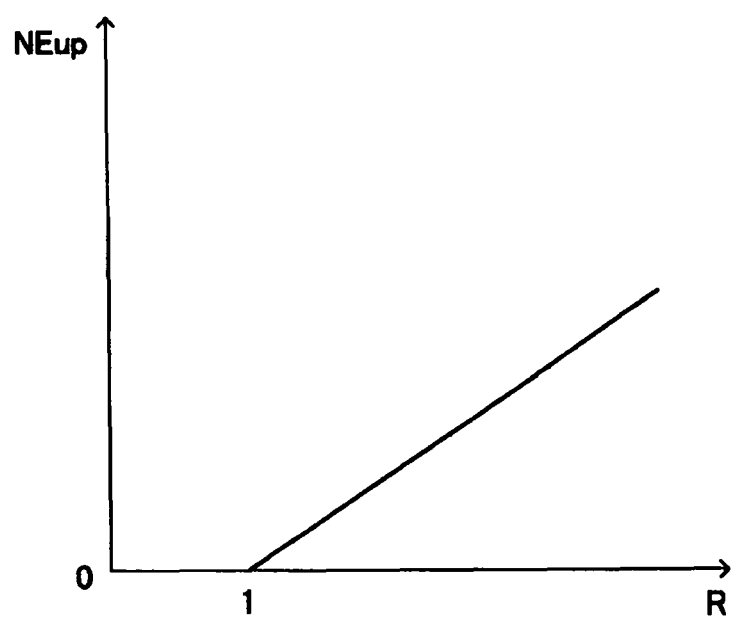
FIG. 21 is a graph illustrating a relationship between a value indicating a change of the reservoir fluid estimated value and an increment of the rotational speed of the motor caused by an update thereof according to a second embodiment of the present invention.
Figure 22:
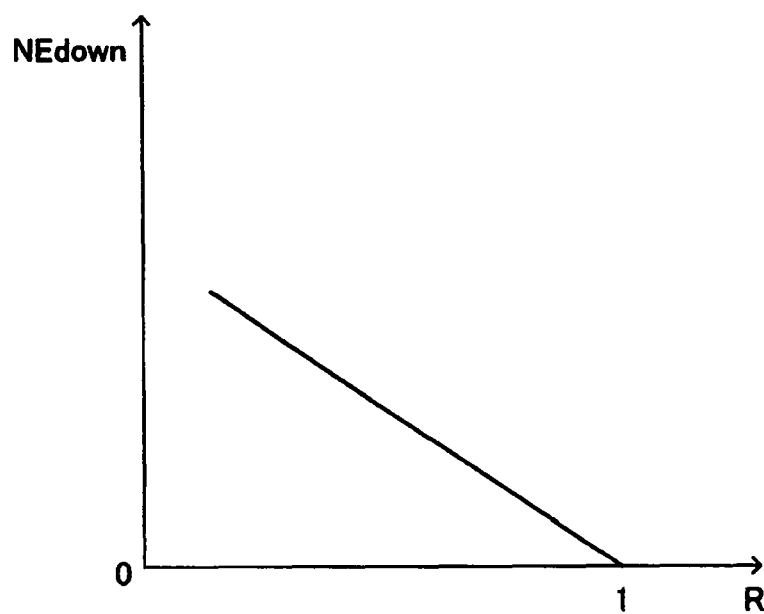
FIG. 22 is a graph illustrating a relationship between a value indicating a change of the reservoir fluid estimated value and a decrement of the rotational speed of the motor caused by an update thereof according to a second embodiment of the present invention.

In this case, the routine proceeds to step 730 in which an increment NEup (≧0) applied for the update of the target rotational speed NEt is determined on the basis of the value R and a table MapNEup illustrated in FIG. 21. The value NEup is set to zero when the value R is equal to one, and is specified to be large when the value R (≧0) is large. That is, when a degree of increase of the reservoir fluid estimated value Q is large, the increment NEup is specified to be large. The routine then proceeds to step 735 in which the target rotational speed NEt is updated by adding the increment NEup to the target rotational speed NEt at that point.

A case in which the negative determination is made in step 725 (i.e., reservoir fluid estimated value Q is decreasing), which corresponds to the time t3 in FIG. 23, will be explained below. In this case, the routine proceeds to step 745 in which a decrement NEdown ($\geq 0$) applied for the update of the target rotational speed NEt is determined on the basis of the value R and a table MapNEdown illustrated in FIG. 22.

The value NEdown is specified to be large when the value R ($0 \geq R<1$) is small. That is, when a degree of decrease of the reservoir fluid estimated value Q is large, the decrement NEdown is specified to be large. Next, the routine proceeds to step 750 in which the target rotational speed is updated by subtracting the decrement NEdown from the target rotational speed NEt at that point.

The routine then proceeds to step 740 in which the previous value Qcb of the value Qc is updated to the value Qc at that time and proceeds to step 795 so that the present routine can be terminated.

As mentioned above, according to the apparatus for controlling a pump driving motor of the second embodiment, the (average) rotational speed NE of the motor MT can be controlled so as to mach the target rotational speed NEt during the ABS control. The initial value NEini of the target rotational speed NEt (i.e., value obtained at the start of the ABS control, see the time t1 in FIG. 23) is determined on the basis of the vehicle body deceleration speed DVso at the start of the ABS control so that the reservoir fluid volume can vary within a range from zero to the maximum reservoir fluid volume Qfull.

During the ABS control, each time the update timing of the target rotational speed NEt (i.e., linear pressure-intensifying control end point) arrives, it is determined whether the reservoir fluid estimated value Q is increasing or decreasing. In the cases where the reservoir fluid estimated value Q is increasing ($R \geq 1$) (see the time t2 or t4 in FIG. 23), i.e., the discharge volume of the hydraulic pumps HPf and HPr is insufficient, the target rotational speed NEt is updated to be larger. Accordingly, the decreasing gradient of the reservoir fluid volume (i.e., reservoir fluid estimated value Q) in the time period from t2' to t3, and after the time t4' is larger than the decreasing gradient of the reservoir fluid volume in the time period from t1' to t2, and t3' to t4, respectively. As a result, an occurrence of the reservoir fluid volume to reach the maximum reservoir fluid volume Qfull during the ABS control, which may be resulted from a small estimation of the initial value NEini, can be prevented.

Meanwhile, in the cases where the reservoir fluid estimated value Q is decreasing (R<1) (see the time t3 in FIG. 23), i.e., the discharge volume of the hydraulic pumps HPf and HPr is excessive, the target rotational speed NEt is updated to be smaller. Thus, the decreasing gradient of the reservoir fluid volume from the time t3' to t4 is smaller than the decreasing gradient of the reservoir fluid volume from the time t2' to t3. As a result, an occurrence of the reservoir fluid volume to reach zero during the ABS control, which may be resulted from a large estimation of the initial value NEini, can be prevented.

Further, even when an estimation error is included in the reservoir fluid estimated value Q, a variation of the reservoir fluid estimated value Q is unlikely to receive an influence of the estimation error. The variation (increase/decrease direction) of the reservoir fluid estimated value Q tends to match the actual variation (increase/decrease direction) of the reservoir fluid volume. Accordingly, the rotational speed of the motor MT can be further accurately controlled so that the actual reservoir volume varies within the range from zero to the maximum reservoir fluid volume Qfull, by the update of the target rotational speed NEt of the motor MT based on the increase/decrease of the reservoir fluid estimated value Q according to the second embodiment, as compared to a case where the target rotational speed NEt is updated on the basis of the reservoir fluid estimated value Q itself so that the reservoir fluid estimated value Q itself varies within the range from zero to the maximum reservoir fluid volume Qfull.

The aforementioned second embodiment is not limited to the above. For example, according to the second embodiment, the target rotational speed NEt of the motor MT is used directly as a value corresponding to the target rotational speed of the motor. Alternatively, the target discharge volume of the hydraulic pumps HPf and HPr can be used as the value corresponding to the target rotational speed.

Further, according to the second embodiment, the value R (=Qc/Qcb), i.e., a ratio of the present value to the previous value of the value Qc is used for acquiring the variation of the reservoir fluid estimated value Q. Alternatively, a value obtained by subtracting the previous value from the present value, i.e., value S (=Qc−Qcb), can be used. In this case, when $S \geq 0$, it is determined that the reservoir fluid estimated value Q is increasing. In addition, when S<0, it is determined that the reservoir fluid estimated value Q is decreasing.

Furthermore, according to the second embodiment, the linear pressure-intensifying end point is applied as the predetermined timing at which it is determined whether the reservoir fluid estimated value Q is increasing or decreasing. Alternatively, the pressure-reducing control end point (i.e., hold control start point) or the hold control end point (i.e., linear pressure-intensifying start point) can be used. Further alternatively, a point when a predetermined time has elapsed after the ABS control start can be used.

Furthermore, according to the second embodiment, the voltage threshold value Von is controlled so as to control the rotational speed of the motor MT. Alternatively, the ON time Ton can be controlled so as to control the rotational speed of the motor MT. Further alternatively, the voltage threshold value Von and the ON time Ton can be both controlled.

Furthermore, according to the second embodiment, the initial value NEini of the target rotational speed NEt is determined on the basis of the vehicle body deceleration Vso. Alternatively, the initial value NEini can be determined on the basis of a friction coefficient of a road surface.

Figure 24:
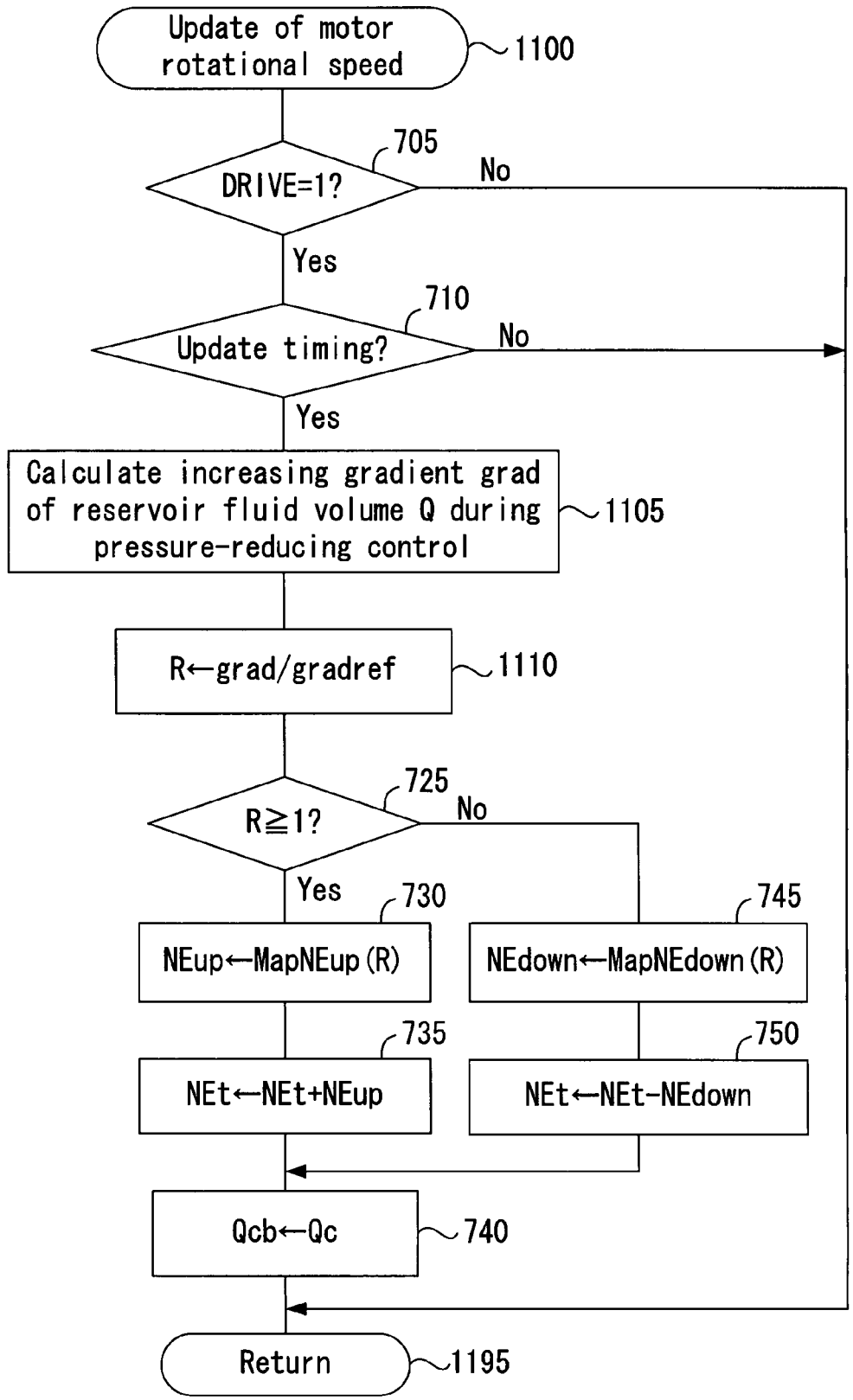
FIG. 24 is a flowchart illustrating a motor rotational speed update routine performed by the CPU according to a variation of the second embodiment of the present invention.

Furthermore, according to the second embodiment, the target rotational speed NEt is updated on the basis of whether the reservoir fluid estimated value Q is increasing or decreasing. Alternatively, the target rotational speed NEt can be updated on the basis of the increasing gradient of the reservoir fluid estimated value Q during the pressure-reducing control. In this case, instead of the routine in FIG. 20, the routine in the flowchart illustrated in FIG. 24 is performed. In the routine in FIG. 24, steps same as those in FIG. 20 bear the same step numbers.

The routine in FIG. 24 differs from the routine in FIG. 20 only in replacement of steps 715 and 720 by steps 1105 and 1110. In the following, only the different point will be explained. According to the routine in FIG. 24, the update timing is specified at the end of the pressure-reducing control.

In step 1105, an increasing gradient grad of the reservoir fluid estimated value Q during the present pressure-reducing control is calculated. For example, the increasing gradient grad can be calculated on the basis of two reservoir fluid estimated values Q at the start of the pressure-reducing control and at the end of the pressure-reducing control, or can be calculated on the basis of reservoir fluid estimated values Q at multiple (at least three) points during the present pressure-reducing control.

In step 1110, the value R is set to a value (grad/gradref). The value gradref is an optimum value (reference value) of the increasing gradient of the reservoir fluid volume during the pressure-reducing control required for the reservoir fluid volume to vary within the range from zero to the maximum reservoir fluid volume Qfull during the ABS control. The value gradref can be determined on the basis of the vehicle body deceleration DVso.

Accordingly, when the increasing gradient grad of the present pressure-reducing control is equal to or greater than the reference value gradref, the value R is equal to or greater than 1. In this case, processes in steps 730 and 735 are performed to thereby update the target rotational speed NEt to be larger. Such processes are based on that when the increasing gradient grad is larger than the reference value gradref, the discharge volume of the hydraulic pumps HPf and HPr (and thus the rotational speed of the motor MT) is insufficient.

On the other hand, when the increasing gradient grad is smaller than the reference value gradref, the value R is smaller than one. In this case, the processes in steps 730 and 735 are performed to thereby update the target rotational speed NEt to be smaller. Such processes are based on that when the increasing gradient grad is smaller than the reference value gradref, the discharge volume of the hydraulic pumps HPf and HPr (and thus the rotational speed of the motor MT) is excessive.

According to the aforementioned structures, the target rotational speed NEt of the motor can be appropriately updated so that the actual reservoir fluid volume can vary within the range from zero to the maximum reservoir fluid volume Qfull.

According to the aforementioned embodiments, the apparatus for controlling a pump driving motor is used in an anti-skid control apparatus performing a combination of a pressure-reducing control and a pressure-intensifying control multiple times, the pressure-reducing control in which a wheel cylinder pressure of a wheel decreases when the wheel is brought to a locked state during a braking of a vehicle, the pressure-intensifying control in which the wheel cylinder pressure increases when the locked state of the wheel is released by the pressure-reducing control. Estimated fluid volume obtaining means obtains a reservoir fluid estimated value that is an estimated volume of a brake fluid discharged to a reservoir during the pressure-reducing control performed at a predetermined time. In addition, hydraulic pump controlling means specifies the number of rotations of the motor for driving a hydraulic pump that sucks the brake fluid from the reservoir based on the estimated volume and for driving the hydraulic pump with the specified number of rotations of the motor. Further, changing means changes the number of rotations of the motor applied when the brake fluid in the reservoir is discharged to be smaller than the number of rotations of the motor specified on the basis of the estimated volume at a time of the pressure-reducing control that follows the pressure-intensifying control performed at the predetermined time in a case where an actual time defined from a driving start of the hydraulic pump to a point where the brake fluid in the reservoir actually turns to zero is shorter than an estimated time over which the estimated volume turns to zero by a driving of the hydraulic pump with the specified number of rotations of the motor.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An apparatus for controlling a pump driving motor, the apparatus being used in an antiskid control apparatus performing a combination of a pressure-reducing control and a pressure-intensifying control multiple times, the pressure-reducing control in which a wheel cylinder pressure of a wheel decreases when the wheel is brought to a locked state during a braking of a vehicle, the pressure-intensifying control in which the wheel cylinder pressure increases when the locked state of the wheel is released by the pressure-reducing control, the apparatus for controlling a pump driving motor, comprising:
   estimated fluid volume obtaining means for obtaining a reservoir fluid estimated value that is an estimated volume of a brake fluid discharged to a reservoir during the pressure-reducing control performed at a predetermined time;
   hydraulic pump controlling means for specifying the number of rotations of the motor for driving a hydraulic pump that sucks the brake fluid from the reservoir based on the estimated volume and for driving the hydraulic pump with the specified number of rotations of the motor;
   actual time measuring means for measuring an actual time defined from a driving start of the hydraulic pump to a point where the brake fluid in the reservoir actually turns to zero;
   estimated time obtaining means for obtaining an estimated time during which the estimated volume of the brake fluid turns to zero;
   determining means for determining whether or not the actual time measured by the actual time measuring means is shorter than the estimated time obtained by the estimated time obtaining means based on a comparison between the actual time and the estimated time; and
   changing means for changing the number of rotations of the motor applied when the brake fluid in the reservoir is discharged to be smaller than the number of rotations of the motor specified on the basis of the estimated volume at a time of the pressure-reducing control that follows the pressure-intensifying control performed at the predetermined time in a case where the determining means determine that the actual time is shorter than the estimated time.

2. An apparatus for controlling a pump driving motor according to claim 1, further comprising vehicle stop detecting means for detecting that a vehicle is stopped, wherein the changing means increases the number of rotations of the motor that has been specified by the hydraulic pump controlling means in a case where the brake fluid remains in the reservoir after the vehicle stop is detected.

3. An apparatus for controlling a pump driving motor according to claim 1, further comprising estimated master cylinder pressure obtaining means for obtaining a master cylinder pressure estimated value, wherein the hydraulic pump controlling means specifies the number of rotations of the motor based on the reservoir fluid estimated value and the master cylinder pressure estimated value, and the changing means changes the number of rotations of the motor specified by the hydraulic pump controlling means to be larger than the number of rotations of the motor specified on the basis of the estimated volume in a case where an actual off state retention time during which a power supply to the motor is actually retained in an off state is shorter than an estimated off state retention time during which it is estimated that the power supply to the motor is retained in the off state based on the master cylinder pressure.

4. An apparatus for controlling a pump driving motor according to claim 3, wherein the changing means changes the number of rotations of the motor that has been changed by the number of rotations of the motor specified on the basis of the master cylinder pressure estimated value in a case where it is detected that the actual off state retention time becomes equal to or greater than the estimated off state retention time while the number of rotations of the motor that has been changed is larger than the number of rotations of the motor specified on the basis of the master cylinder pressure estimated value.

5. An apparatus for controlling a pump driving motor according to claim 1, wherein the changing means modifies the number of rotations of the motor that has been previously changed to be larger than the number of rotations of the motor specified on the basis of the master cylinder pressure estimated value when a state in which an actual off state retention time is shorter than an estimated off state retention time continues for twice as long as a time period from a start of the pressure-reducing control to a start of a next pressure-reducing control.

6. An apparatus for controlling a pump driving motor according to claim 5, wherein the changing means changes the number of rotations of the motor that has been changed by the number of rotations of the motor specified on the basis of the master cylinder pressure estimated value in a case where it is detected that the actual off state retention time continues for a predetermined time while the number of rotations of the motor that has been changed is larger than the number of rotations of the motor specified on the basis of the master cylinder pressure estimated value.

7. An apparatus for controlling a pump driving motor according to claim 1, wherein the number of rotations of the motor is adjusted by controlling a ratio of an on time during which the motor is retained in an on state by receiving a power to an off time during which the motor is prevented from receiving the power, and the actual time is defined as a time period from the driving start of the hydraulic pump to a point where the off time during which the motor is prevented from receiving the power exceeds a reservoir empty off time during which the reservoir is empty.

8. The apparatus for controlling the pump driving motor of claim 1, wherein the estimated time obtaining means obtains the estimated time by dividing the reservoir fluid estimated value by a rate which the hydraulic pump sucks the brake fluid from the reservoir.

9. The apparatus for controlling the pump driving motor of claim 1, in the case where the determining means determines that the actual time is shorter than the estimated time, the number of rotations of the motor applied when the brake fluid in the reservoir is discharged is reduced by reducing an amount of time the motor is powered by a predetermined amount of time.

10. A pump driving motor controller for use with an anti-skid control apparatus which sequentially and repetitively performs pressure-reducing control and pressure-intensifying control, the pressure-reducing control decreases wheel cylinder pressure of a wheel when the wheel is in a locked state during braking of a vehicle by discharging brake fluid to a reservoir, the pressure-intensifying control increases the wheel cylinder pressure when the locked state of the wheel is released by the pressure-reducing control, the pump driving motor controller comprising:

estimated fluid volume obtaining means for obtaining a reservoir fluid estimated value indicating an estimated volume of a brake fluid discharged to the reservoir during the pressure-reducing control performed at a predetermined time;

hydraulic pump controlling means for specifying a number of rotations of the pump driving motor required to empty the break fluid from the reservoir based on the reservoir fluid estimated value and for operating the pump driving motor to rotate the specified number of rotations;

actual time measuring means for measuring an actual amount of time between a start of the driving of the pump driving motor and when operation of the pump driving motor has emptied the break fluid from the reservoir;

estimated time obtaining means for obtaining an estimated amount of time required for the operation of the pump driving motor to empty the break fluid from the reservoir based on the reservoir fluid estimated value;

determining means for determining whether the actual amount of time is less than the estimated amount of time; and changing means for reducing the number of rotations of the pump driving motor required to empty the brake fluid from the reservoir to be less than the number of rotations of the pump driving motor specified by the hydraulic pump controlling means when the determining means determines the actual amount of time is less than the estimated amount of time.

* * * * *